United States Patent
Eineren et al.

(10) Patent No.: US 10,095,026 B2
(45) Date of Patent: Oct. 9, 2018

(54) SELF-CLEANING CAMERA HOUSINGS, SELF-CLEANING CAMERA MODULES, AND MONITORING SYSTEMS COMPRISING SELF-CLEANING CAMERA MODULES

(71) Applicant: AGRICAM AB, Linkoping (SE)

(72) Inventors: Ellinor Eineren, Linkoping (SE); Joachim Tollstoy, Linkoping (SE); Claes Nelsson, Linkoping (SE); Landy Toth, Doylestown, PA (US)

(73) Assignee: AGRICAM AB, Linköping (SE)

( * ) Notice: Subject to any disclaimer, the term of this patent is extended or adjusted under 35 U.S.C. 154(b) by 0 days.

(21) Appl. No.: 15/464,809

(22) Filed: Mar. 21, 2017

(65) Prior Publication Data

US 2017/0192226 A1    Jul. 6, 2017

Related U.S. Application Data

(63) Continuation of application No. 15/056,077, filed on Feb. 29, 2016, now Pat. No. 9,746,666, which is a continuation of application No. 14/412,551, filed as application No. PCT/IB2013/001534 on Jun. 28, 2013, now Pat. No. 9,304,377.

(60) Provisional application No. 61/716,756, filed on Oct. 22, 2012, provisional application No. 61/666,971, filed on Jul. 2, 2012.

(51) Int. Cl.
*H04N 5/33* (2006.01)
*G02B 27/00* (2006.01)
*G03B 17/56* (2006.01)

(52) U.S. Cl.
CPC ....... *G02B 27/0006* (2013.01); *G03B 17/568* (2013.01); *H04N 5/33* (2013.01)

(58) Field of Classification Search
CPC ........................................................ H04N 5/33
USPC ........................................................ 348/375
See application file for complete search history.

(56) References Cited

U.S. PATENT DOCUMENTS

| | | |
|---|---|---|
| 5,394,208 A | 2/1995 | Campbell |
| 6,313,456 B1 | 11/2001 | Miyashita et al. |
| 2002/0005440 A1 | 1/2002 | Holt et al. |
| 2003/0155001 A1 | 8/2003 | Hoetzer et al. |
| 2006/0289768 A1 | 12/2006 | Vallese et al. |
| 2007/0132610 A1 | 6/2007 | Guernalec et al. |
| 2007/0291130 A1 | 12/2007 | Broggi et al. |
| 2008/0204555 A1 | 8/2008 | Hughes |

(Continued)

FOREIGN PATENT DOCUMENTS

| | | |
|---|---|---|
| CN | 1612041 A | 5/2005 |
| CN | 1829640 A | 9/2006 |

(Continued)

OTHER PUBLICATIONS

International Search Report issued in corresponding application No. PCT/IB2013/001534, dated Mar. 4, 2014.

(Continued)

*Primary Examiner* — Joel Fosselman
(74) *Attorney, Agent, or Firm* — Carter, DeLuca, Farrell, Schmidt, LLP

(57) ABSTRACT

A camera housing including a self-cleaning function is disclosed. More particularly, a self-cleaning camera module including a fluid based cleaning system is disclosed. A self-cleaning camera module including a fluid based cleaning system for providing accurate imaging in an uncontrolled environment is disclosed. A monitoring system including one or more self-cleaning camera modules is disclosed.

16 Claims, 7 Drawing Sheets

(56) References Cited

U.S. PATENT DOCUMENTS

| | | |
|---|---|---|
| 2009/0201413 A1 | 8/2009 | Fishman |
| 2009/0256913 A1 | 10/2009 | Silverman |
| 2009/0256914 A1 | 10/2009 | Silverman |
| 2011/0073142 A1 | 3/2011 | Hattori et al. |
| 2011/0181730 A1 | 7/2011 | Cabib et al. |
| 2011/0220797 A1 | 9/2011 | Hoelter et al. |
| 2011/0266375 A1 | 11/2011 | Ono et al. |

FOREIGN PATENT DOCUMENTS

| | | |
|---|---|---|
| CN | 201919076 U | 8/2011 |
| CN | 102267419 A | 12/2011 |
| CN | 102378981 A | 3/2012 |
| DE | 19707223 A1 | 9/1997 |
| JP | 2000-4387 A | 1/2000 |
| JP | 2007-53448 A | 3/2007 |
| WO | 2006/033828 A1 | 3/2006 |

OTHER PUBLICATIONS

Chinese Office Action in corresponding Application No. CN2013800354527 dated Jan. 4, 2017, 26 pages.
New Zealand Examination Report for NZ Patent Appln No. 703287 dated Sep. 20, 2016.
New Zealand Examination Report for NZ Patent Appln No. 703287 dated Feb. 1, 2017.
New Zealand Examination Report for NZ Patent Appln No. 703287 dated Nov. 21, 2016.
Office Action for corresponding Chinese Application No. 201380035452.7 dated Aug. 22, 2017.

SELF-CLEANING CAMERA HOUSINGS, SELF-CLEANING CAMERA MODULES, AND MONITORING SYSTEMS COMPRISING SELF-CLEANING CAMERA MODULES

CROSS-REFERENCE TO RELATED APPLICATION

The present application is a continuation of U.S. patent application Ser. No. 15/056,077 filed on Feb. 29, 2016, which is a continuation of U.S. patent application Ser. No. 14/412,551 filed on Jan. 2, 2015, now U.S. Pat. No. 9,304,377, which is a national stage application of PCT International Application No. PCT/IB2013/001534 filed on Jun. 28, 2013, which claims benefit of and priority to U.S. Provisional Application No. 61/666,971 filed on Jul. 2, 2012, and U.S. Provisional Application No. 61/716,756 filed on Oct. 22, 2012, the entire contents of each of which are hereby incorporated by reference herein in their entireties.

BACKGROUND

Technical Field

The present disclosure is directed to camera housings and in particular to self-cleaning camera housings for use with thermal imaging cameras. The present disclosure is further directed towards self-cleaning camera modules.

Background

Remote monitoring of subjects, chemical species, and/or environments is gaining importance around the world. In particular, remote monitoring is becoming a valuable tool for use in applications such as process optimization, livestock management, security, surveillance, geothermal analysis, health monitoring, gas leakage detection, etc.

There is a need to use cameras (e.g. thermal imaging cameras, visible wavelength cameras, etc.) in remote and/or potentially grimy locations. Such locations include industrial settings, wilderness, offices, recreational settings, public venues, airports, etc. In many such locations, there may be maintenance or reliability issues associated with remote access to the monitoring equipment, the equipment being located in areas of high traffic, buildup of contaminants on the lens/window of the camera housing, uncontrollable environmental conditions, and the like. Such issues may negatively affect the performance, maintenance, and/or cleaning schedules of the associated camera systems (e.g. thermal imaging camera systems).

In particular, buildup of contaminants on the lens/window of the camera housing may obscure the view of the target environment; negatively affect the quality of the readings obtained by the camera (e.g. affect accuracy of thermal images captured there through), absorb/refract/reflect incident energy there upon, etc.

In many cases, the lenses/windows used for thermal imaging cameras may be constructed from one or more expensive, fragile, and/or mechanically soft materials. Thus they may be prone to scratching, cracking, and/or fracture during routine cleaning and/or maintenance procedures.

Of particular relevance, automated monitoring of subjects in industrial settings is growing in popularity. In the livestock industry (e.g. cows, fish, poultry, swine, sheep, etc.) for example, the management of cattle is of particular interest to industrial institutions, food distribution networks, and farmers. Events such as breakouts of disease (e.g. infection, mastitis, influenza, etc.) can wipe out entire herds and/or otherwise adversely affect production of milk or produce. In general, the automated monitoring of livestock may be very useful for assisting with herd management, but may be hampered by the need for maintaining an un-obscured and/or un-fouled view of the animals over prolonged time periods. Problems such as equipment fouling may be compounded in actual applications, as such systems may often be physically located near to the intended subjects, (e.g. so as to better elucidate fine spatial features thereupon, for easier target identification, to lower the technical requirements of camera modules, etc.), which may be of interest in the intended application.

SUMMARY

One objective of the present disclosure is to provide a self-cleaning camera module.

Another objective is to provide a self-cleaning thermal imaging camera housing.

Another objective is to provide an automated monitoring system capable of performing self-maintenance.

Yet another objective is to provide a self-cleaning lens and/or window to isolate a thermal imaging camera from an uncontrolled environment.

The above objectives are wholly or partially met by housings, modules, systems, and methods described herein. In particular, features and aspects of the present disclosure are set forth in the appended claims, following description, and the annexed drawings.

According to a first aspect there is provided, a camera module including a housing and a faceplate with an aperture each in accordance with the present disclosure. The camera includes an optical path and may be included within the housing, oriented such that the optical path at least partially coincides with the aperture. The camera module including one or more ports coupled to the housing, configured so as to direct a cleaning fluid towards the aperture.

The camera module may include one or more channels coupled to the housing, in fluid communication with one or more of the ports, configured to direct the fluid from a fluid source to one or more of the ports.

One or more of the ports and/or one or more of the channels may be embedded into the faceplate, configured so as to receive a gas-based and a liquid-based cleaning fluid. In aspects, one or more of the ports and/or channels may be configured to accept a gas based cleaning fluid and one or more of the ports and/or channels may be configured to accept a liquid based cleaning fluid.

The camera module may include an optically transparent window pane coupled to the faceplate, substantially coextensive with the aperture. In aspects, the window pane may be substantially transparent to infrared radiation and the camera may be an infrared camera. In aspects, the window pane may include one or more materials such as germanium, calcium fluoride, sapphire, lithium fluoride, zinc, selenide, barium fluoride, an IR transmitting polymer, combinations thereof, and the like.

The camera module may include a fluid reservoir in fluid communication with one or more of the ports. The fluid reservoir may be configured to hold at least a portion of the cleaning fluid.

The camera module may include one or more control elements (e.g. valves, pumps, mixers, agitators, etc.) in fluid communication with one or more of the ports, the control elements configured to control the flow of the cleaning fluid to the ports, mix aspects of the cleaning fluid, filter the cleaning fluid, agitate the cleaning fluid, or the like.

The camera module may include a mixer configured to mix a first fluid with a second fluid to form the cleaning fluid. In aspects, the first fluid may be substantially water and the second fluid may include one or more of a surfactant, a detergent, an acid, food safe constituents, combinations thereof, and the like.

In aspects, the camera module may include a processor in electrical communication with the camera, the camera configured to send one or more images to the processor, the processor configured to control the flow of fluid to the ports based upon one or more of the images, a control signal, or the like.

In aspects, the camera module may include a protective cover adapted to cover at least a portion of the aperture when the camera is not in use. In aspects, the protective cover may be actuated between a first and a second position, the first position substantially covering the aperture and the second position substantially exposing the aperture. In aspects, one or more of the ports may be included in the protective cover.

In aspects, one or more of the ports may include a nozzle, configured such that a fluid passing there through forms a fluid jet of a substantially controlled shape (e.g. a line, an ellipse, a crescent, a hemisphere, a fan, combinations thereof, etc.) upon exiting the nozzle.

According to another aspect there is provided, use of a camera module in accordance with the present disclosure in a livestock monitoring system.

According to yet another aspect there is provided, use of a camera module in accordance with the present disclosure to image at least a portion of an animal.

According to another aspect there is provided, use of a camera module in accordance with the present disclosure to monitor a temperature (i.e. of a surface of a target, etc.) in an uncontrolled environment.

According to yet another aspect there is provided, a method for imaging a target, including obtaining one or more images of the target with a camera through a window pane, assessing the cleanliness of the window pane from one or more of the images to create a cleanliness factor; and cleaning the window pane based on the cleanliness factor. In aspects, the method may include releasing one or more of the images for analysis based upon the cleanliness factor; exposing the window pane to the target; and/or locating the target.

According to another aspect there is provided, a method for operating a camera module in accordance with the present disclosure including taking one or more images with the camera; assessing the cleanliness of the optical path with one or more of the images; and providing cleaning fluid to the aperture via one or more of the ports based upon the assessment. In aspects, the method may include validating one or more of the images for analysis based upon the assessment and/or exposing and/or covering the aperture.

According to yet another aspect there is provided, a self-cleaning window kit for installation along the optical path of a camera including a window housing adapted to be attached to the camera such that the window provides an aperture along the optical path thereof, and one or more ports coupled to the window housing configured so as to direct a cleaning fluid passing there through onto the aperture.

In aspects, the self-cleaning window kit may include an optically transparent window pane adapted to be coupled to the window housing, substantially coextensive with the aperture. In aspects, the window pane may be substantially transparent to infrared radiation and the camera may be an infrared camera. In aspects, the window pane may include a material such as germanium, calcium fluoride, sapphire, lithium fluoride, zinc selenide, barium fluoride, IR transmitting polymers, combinations thereof, and the like.

In aspects, one or more ports may include a nozzle configured such that a fluid passing there through forms a fluid jet of a substantially controlled shape (e.g. a line, an ellipse, a crescent, a hemisphere, a fan, combinations thereof, etc.) upon exiting the nozzle.

In aspects, the self-cleaning window kit may include a fluid reservoir in fluid communication with one or more of the ports configured to hold at least a portion of the cleaning fluid.

In aspects, the self-cleaning window kit may include one or more control elements (e.g. valves, pumps, mixers, agitators, etc.) in fluid communication with one or more of the ports, the control elements configured to control the flow of the cleaning fluid to the ports, mix aspects of the cleaning fluid, filter the cleaning fluid, agitate the cleaning fluid, or the like.

In aspects, the self-cleaning window kit may include a mixer configured to mix a first fluid with a second fluid to form the cleaning fluid. In aspects, the first fluid may be substantially water and the second fluid may include one or more of a surfactant, a detergent, an acid, food safe constituents, combinations thereof, and the like.

In aspects, the self-cleaning window kit may include a protective cover adapted to cover the optically transparent pane when the camera is not in use. In aspects, the protective cover may be adapted to be actuated between a first and a second position, the first position substantially covering the aperture and the second position substantially exposing the aperture.

In aspects, the kit may include a mixer in fluid communication with one or more of the ports, the mixer configured to mix a first fluid with a second fluid to form at least a portion of the cleaning fluid. In aspects, the first fluid may be substantially water and the second fluid may include one or more of a surfactant, a detergent, an acid, food safe constituents, combinations thereof, and the like.

In aspects, the window housing may include one or more channels in fluid communication with one or more of the ports.

According to yet another aspect there is provided, a monitoring system for assessing a target including a controller configured to generate one or more control signals; a camera module in accordance with the present disclosure configured to obtain images from at least an aspect of the target and convey the images to the controller, the camera module configured to respond to one or more of the control signals; and a sensing subsystem and/or a surveillance camera configured to convey the location, orientation, and/or identification of the target to the controller, the controller configured to analyze the location, orientation, and/or identification of the target to produce one or more of the control signals.

In aspects, the target may be a living being (e.g. a human, an animal, a fish, a plant, etc.), an animal (e.g. livestock, a cow, a sheep, a pig, a horse, a deer, etc.), a plant, a manufacturing process, a wilderness environment, a gas, or a combination thereof.

In aspects, the monitoring system may be configured to generate a diagnostic signal (e.g. fever, mastitis, virus, bacterial infection, rut, etc.) based upon one or more of the images.

According to another aspect there is provided a self-contained camera module for deployment into an environment including a housing including a faceplate with an aperture; a camera including an optical path, the camera included within the housing, oriented such that the optical path at least partially coincides with the aperture; one or more ports coupled to the housing, configured so as to direct a cleaning fluid towards the aperture; an energy harvesting subsystem electrically coupled to the camera, configured to provide power thereto; and a fluid harvesting system coupled to a reservoir, configured to collect a fluid from the environment.

In aspects, the self-contained camera module may include a radio electrically coupled to the camera to communicate between the camera module and a remote control center.

DETAILED DESCRIPTION

Figure 1A:
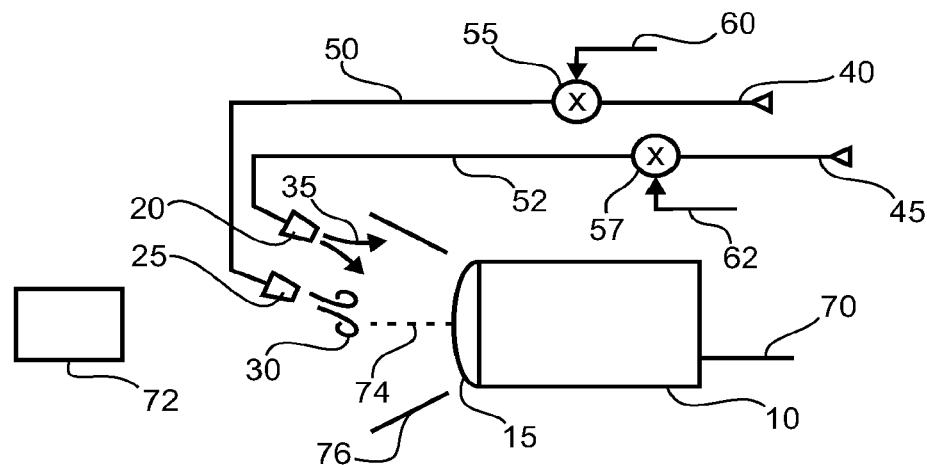
FIGS. 1a-b show schematic representations of aspects of a camera module in accordance with the present disclosure.

Particular embodiments of the present disclosure are described hereinbelow with reference to the accompanying drawings; however, the disclosed embodiments are merely examples of the disclosure and may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. Like reference numerals may refer to similar or identical elements throughout the description of the figures.

By camera housing is meant a housing for enclosing one or more cameras (e.g. a digital camera, a visible light camera, a near-infrared reflectance imaging camera, an infrared camera, a fluorescence imaging camera, a UV imaging camera, a thermal imaging camera, etc.), and for optionally enclosing one or more of control electronics, cleaning aspects, and the like. The housing may also include one or more mounting features, connectors, and the like. In general, a camera housing in accordance with the present disclosure may substantially isolate one or more components enclosed therein (e.g. camera, electronics, etc.) from a surrounding environment.

By camera module is meant a module including one or more cameras, optionally a camera housing in accordance with the present disclosure, control electronics, cleaning aspects, actuators, combinations thereof, and the like in each in accordance with the present disclosure. The camera module may include one or more actuators (e.g. valves, servo valves, pumps, compressors, switches, servo motors, etc.) for operating one or more components included in the module, for orienting one or more aspects of the camera module in three-space (i.e. so as to orient the camera, etc.). The camera module may also include or receive signals from one or more control circuits configured to operate one or more of the cameras and/or one or more cleaning aspects, one or more protective aspects, actuators, and/or surveillance aspects of the module.

In aspects, the camera module may be configured to monitor one or more targets in an environment into which it is placed (i.e. as part of a surveillance system, an analysis system, an industrial control process, etc.). A target may be a subject (e.g. a machine, a vehicle, a living organism, a human, an animal, a cow, a plant, etc.), an event (e.g. a concert, a wildfire, a crop dusting, a weather event, etc.), an aspect of an environment (e.g. a gas, a chemical specie, an exhaust leak, a processing line, feeding equipment, etc.), a location (e.g. a manufacturing plant, a green house, a concert hall, a theatre, a shopping center, forest trail, a barn, a field, a crop, a ski resort, etc.), a process (e.g. a milking process, a fabrication procedure, a mating process, a feeding process, etc.).

In aspects, a camera module in accordance with the present disclosure may be configured to analyze a thermal signature of a vehicle (i.e. a stationary vehicle, a moving vehicle, etc.), or aspect thereof (i.e. an undercarriage, a tank, a fuel tank, a brake pad, a wheel surface, etc.). In aspects, such a camera module may be placed under a road surface, within a tunnel entrance, etc. Such a camera module may be configured to inspect a vehicle during passage thereof into a restricted area, into a confined area, a hazardous area, through an inspection station, etc.

In aspects, a camera module in accordance with the present disclosure may be configured to analyze one or more aspects of plant-life, a plant, a crop, etc. Such a system may be configured to perform thermography (i.e. passive thermography, active thermography, etc.), near-infrared reflectance imaging, reflectance imaging, fluorescence imaging, combinations thereof, or the like of the plant-life. Such imaging processes may be used to diagnose disease, determine growth efficiency, monitor farming processes, investigate infestations, viral infections, fungal infestations, etc. Such imaging may be performed in generally uncontrolled and/or dirty environments.

In aspects, a camera module in accordance with the present disclosure may be configured to analyze one or more chemical species in an environment within the field of view of the camera module. In such cases, the camera module may include a camera configured to detect relevant wavelengths associated with the desired chemical species. Such a configuration may be advantageous for performing gas detection in an environment, detecting contaminants in an environment, detecting fouling of an associated lens, window pane, etc.

In aspects, an infrared imaging system in accordance with the present disclosure may be configured to identify one or more chemical species. Some non-limiting examples of such chemical species include ammonia, arsine, butane, carbon dioxide, chloroethane, diborane, diesel, DMMP, DIMP, ethylene oxide, formaldehyde, gasoline, heptafluoropropane, hydrogen bromide, hydrogen chloride, hydrogen cyanide, hydrogen sulfide, isopropanol, methane, natural gas, phosgene, propane, sulfur hexafluoride, vinyl chloride, solvents, alcohols, cleaning agents, benzene, butane, ethane, ethylbenzene, ethylene, heptane, hexane, isoprene, MEK, methane methanol, MIBK, octane, pentane, 1-pentane, propane, propylene, toluene, xylene, acetyl chloride, allyl bromide, allyl chloride, allyl fluoride, furan, hydrazine, methylsilane, propenal, propene, tetrahydrofan, trichloroethyle, vinyl chloride, vinyl cyanide, vinyl ether, combinations thereof, and the like.

In aspects, a camera included within a camera module in accordance with the present disclosure, may be configured to monitor one or more subjects within a livestock management environment (e.g for management of milking operations, reproductive monitoring, biogas production, biogas containment, etc.). In aspects, the camera module may be configured to monitor methane gas levels within a barn, monitor methane cloud migration within a barn, detect leakage of methane gas from a barn into a surrounding environment, and the like.

In aspects, a camera module in accordance with the present disclosure may be used to monitor distribution, leakage, and or properties of a biogas distribution system, a gas management system, gas containment process, and/or biogas harvesting system.

In aspects, one or more cleaning functions of the camera housing and/or camera module may be configured to maintain accurate operation thereof during use in an uncontrolled environment. One or more cleaning functions may be configured to automatically maintain cleanliness of one or more aspects of the camera housing, camera module, lens, etc. based on a cleanliness measure (e.g. a measure of grime buildup on the lens, based on a calibration test (e.g. assessment of a calibration target, assessment of markings on one or more components of the lens and/or window pane), including automatic assessment of a cleaning procedure, etc.

Figure 1B:
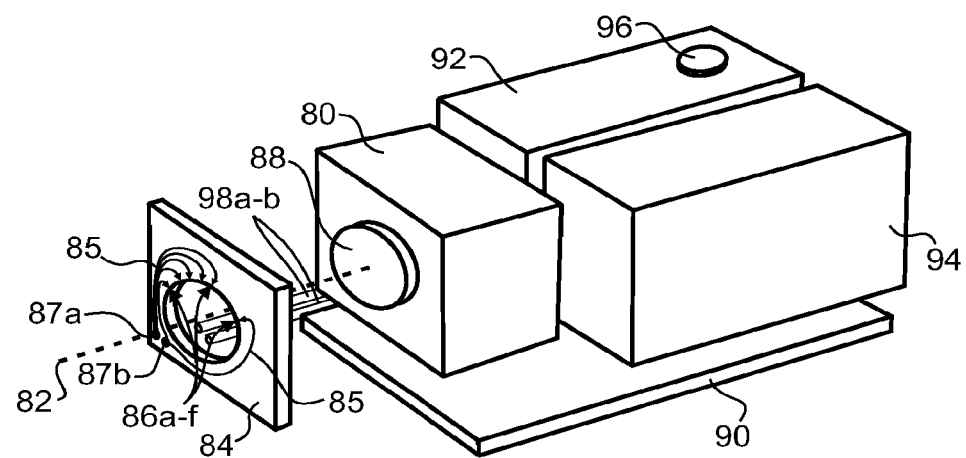

FIGS. 1a-b show schematic representations of aspects of camera module in accordance with the present disclosure. FIG. 1a shows a schematic of aspects of a camera module in accordance with the present disclosure. The camera module includes one or more cameras 10 (e.g. a thermal imaging camera, an infrared camera, a visible spectrum camera, a UV camera, etc.), a lens 15 (i.e. equivalently a window, a window pane, a pane, etc.), and one or more fluid delivery ports 20, 25. The fluid delivery ports 20, 25 may be configured to deliver a gas 30 (e.g. air, nitrogen, dry air, warm air, etc.), and/or a liquid 35 (e.g. including one or more of water, a cleaning solution, a solvent, a surfactant, etc.) to one or more regions (i.e. edges, faces, regions, etc.) of the lens 15. The ports 20, 25 may be connected to one or more gas 40 and/or liquid 45 sources by one or more fluid delivery lines 50, 52. The fluid delivery lines 50, 52 may include one or more control valves 55, 57, configured to control the flow of the fluid 30, 35 (i.e. gas, liquid, combinations thereof, etc.) to the ports 20, 25. The control valves 55, 57 may include electrical interconnects 60, 62 configured to interface with a control unit (not explicitly shown). The control unit may be configured to interface with one or more of the control valves 55, 57, so as to provide control of the fluid flow there through during operation. The camera 10 may include one or more electrical interconnects 70 to interface with a control unit (not explicitly shown) and/or provide an image and/or video feed to an external unit, a control system, a monitoring station, an emergency response system, a weather reporting station, a livestock management system, a surveillance system, etc.

The camera module may include a line of site 74 and field of view 76. During use, the camera module may be oriented so as to face a target 72 (e.g. a living being, an animal, a cow, a vehicle, an environment, a feature, a room, a calibration target, etc.) during use.

Although FIG. 1a shows a schematic with disconnected components, in aspects the components may be intimately interconnected, enclosed within a housing of the camera 10, embedded into the walls of the housing, coupled to a cover plate which is in turn attached to the camera, etc.

In aspects, one or more of the ports 20, 25 may be configured to deliver a fluid (i.e. a cleaning fluid) to the edge of the lens 15, to generate a substantially uniform flow of fluid over a face of the lens 15, direct fluid (gas 30 and/or liquid 35) to various regions of the lens 15, etc. In aspects, one or more of the ports 20, 25 may be configured to direct an associated fluid jet along a vector associated with the lens 15 (i.e. over the edge, over the face, directed towards a region of the lens 15, along an edge of the lens 15, etc.). In aspects, one or more of the ports 20, 25 may be configured so as to form an associated fluid jet with a particular flow pattern (e.g. a uniform flow field, a linear jet, circular pattern, a sheet-like pattern, etc.).

Some non-limiting examples of suitable gases 30 include air, nitrogen, dry air, warm air, argon, oxygen, combinations thereof, and the like.

Some non-limiting examples of suitable liquids 35 include water, deionized water, solvent, ultrapure water, a cleaning solution, a surfactant, a detergent, combinations thereof, and the like.

Some non-limiting examples of suitable solvents include organic solvents, tetrachloroethylene, acetone, isopropyl alcohol, methyl acetate, ethyl acetate, hexane, petrol ether, citrus terpenes, ethanol, combinations thereof, and the like.

Some non-limiting examples of detergents include anionic, cationic, non-ionic, zwitterionic detergents, alkylbenzenesulfonates, deoxycholic acid, polyoxyethylene, glycoside, ethoxylates, PEGylates, glycosides, biosurfactants, cleavable detergents, aromatic hydrocarbons, alkyl ethers, fluorocarbons, siloxanes, sulfates, sulfonates, phosphates, carboxylates, acetic acid, fatty alcohols, sorbitan alkyl esters, combinations thereof, and the like.

In aspects, one or more constituents of the cleaning solution may be selected based on an application specific and/or environmental restriction. For example, in an application relating to livestock monitoring (e.g. monitoring of milking operations, herd health monitoring, reproductive monitoring, etc.), the constituents of the cleaning solution may be limited to food safe additives to prevent risking sickness associated with the livestock consuming one or more residual components of the cleaning solution after a cleaning session.

In aspects, a camera module in accordance with the present disclosure may include a heating element (e.g. a heating band, a heat exchanger, a Peltier device, etc.), to prevent dew formation, condensation in humid environments, etc. onto one or more regions of the lens/window 15 during operation. Such a configuration may be advantageous for maintaining an optical element (e.g. a lens, a window, etc.) above a dew point, during operation. Additionally, alternatively, or in combination, a heating/cooling device may be included in the camera module and configured to maintain one or more aspects of the camera module within an operating temperature range (e.g. maintain one or more aspects within a range of −40 to 60 C, −20 to 45 C, etc.). Such a heating/cooling device may be advantageous for reducing the temperature variation on critical camera components; reducing thermal variance based imaging errors, etc.

Additionally, alternatively, or in combination, the gas delivery means may be configured to deliver a gas jet with a controlled and/or elevated temperature to the lens 15 in order to maintain and/or elevate the temperature thereof during use, to balance the temperature of the device with the surroundings, to remove and/or evaporate condensation, thereupon before completing an observation of the target 72.

In aspects, the ports 20, 25 may be strategically located in the vicinity of the lens 15, perhaps around a portion of the perimeter thereof. The ports 20, 25 may be arranged so as to direct fluid towards a face (e.g. an outward facing face) of the lens/window 15. The ports 20, 25 may be configured so as to direct a fluid at a known trajectory towards the face. In aspects, one or more of the ports 20, 25 may direct the fluid at an angle of less than 45 degrees, less than 30 degrees, less than 20 degrees, less than 10 degrees to a characteristic plane of the lens/window pane 15. In aspects, the ports 20, 25 may be oriented so as to direct fluid towards the lens/window pane 15 at differing trajectories throughout a cleaning procedure. In one non-limiting example, one or more of the ports 20, 25 may be configured to direct fluid 35 towards the lens 15 at a steep angle during a portion of the cleaning process and at a shallow angle during another portion of the cleaning process.

In aspects, one or more of the ports 20, 25 may be configured so as to move with respect to the face of the lens 15. One or more of the ports 20, 25 may be configured so as to move along a trajectory during a cleaning process (i.e. as an associated fluid jet is being delivered through the port 20, 25, etc.). The camera module may include one or more actuators and/or mechanisms (not explicitly shown) coupled to the port 20, 25 so as to provide the motion (i.e. to follow a trajectory, an orientation, etc.).

In aspects, the camera module may include a cap or protective cover in accordance with the present disclosure. The cap may couple to one or more of the ports 20, 25 such that upon closure of the cap, one or more of the ports 20, 25 may be positioned so as to optimally direct fluid 30, 35 towards the lens/window/pane 15 to be cleaned. Such a configuration may be advantageous for protecting the lens/window/pane 15 in a hostile and/or grimy environment where only intermittent use of the camera 10 is needed for the application.

In aspects, a camera module in accordance with the present disclosure may include one or more aspects suitable for assessing the amount and/or location of grime on the surface of the lens 15. The camera module may be configured so as to direct the movement of one or more of ports 20, 25 so as to remove the grime (i.e. so as to direct the trajectory and/or orientation of one or more of the ports 20, 25 during the cleaning process). Such a configuration may be advantageous for minimizing fluid consumption and/or removing stubborn grime during a cleaning process.

In aspects, the camera module may include a multi-wavelength and/or multi-band camera system. The multi-band camera system may include a thermal camera or an infra-red imaging device associated with a measuring filter and a reference filter. The measuring and reference filters may be placed within the optical pathway of the camera, perhaps on a rotating wheel. The filters may be arranged by turns, are placed on the sighting axis of the camera or the imaging device, the measuring filter having a transmission band which includes at least one specific absorption line of a sought-after constituent (i.e. a gas, a tissue analyte, etc.) and being sensitive to the presence of this constituent, the reference filter having a transmission band comparable to that of the measuring filter but not including the absorption line or lines of the sought-after constituent, and therefore being insensitive to the presence of this constituent.

In aspects the lens 15 may include a reference feature (such a material of known emissivity, absorption, transmittance, etc. within the field of view 76 of the camera 10 for use as a reference or calibration aspect of the camera module.

In aspects, the measuring principle for the multi-band camera system includes using the background, a reference marker, and/or a stable region of the observed scene as an infrared source and in highlighting the presence of the sought-after constituent on the line of sight and in calculating the presence thereof by differential processing of the infrared images and/or aspects thereof, spatially in order to process the fluxes derived from different temperature points of the observed region, spectrally so as to distinguish the sought-after constituent from the background, and temporally to eliminate false alarms and untimely detections. The multi-band camera system may be configured to analyze one or more targets such as livestock, cattle, etc.

The camera system may operate in various wavebands, including the IR-III band (from 8 to 14 pm), and/or the IR-II band (from 3 to 5 pm), which may enable more flux to be absorbed, atmospheric absorption additionally being weaker in the IRIII band than in the IR-II band.

In aspects, the camera 10 may be a cooled camera, which may be housed in camera housing together with the cooling means thereof. The cooling means may be housed within the camera housing along with the other electronics, or provided in a separate cabinet. In aspects, the cabinet may contain one or more of the electrical supply means, camera and/or filter control means, means for processing the signals obtained from the camera, combinations thereof and the like.

In aspects, the camera module may be included as part of a remote optical gas and/or constituent detection device, including an infrared camera associated with measuring and reference filters mounted successively on the sighting axis of the camera, and means for processing the signals supplied by the camera and corresponding to the fluxes of at least two areas of different temperature of an observed region. The camera housing may include and/or be connected to an electrical power supply unit.

In aspects, the camera housing may include an infrared detector with a matrix of photodetectors (i.e. a camera), and a filter assembly carried by a rotating disk, this assembly being arranged between the lens and the detector and including power-driven means for successively bringing each filter onto the sighting axis of the lens and detector, the camera housing including electronic circuits for controlling the detector, for acquiring and digitizing the infrared signals, images, and/or videos and for controlling the means for rotating the filter disk, as well as a processor configured for controlling the operation of the camera housing and for applying gas detection algorithms to the signals supplied by the detector.

Such a configuration may be advantageous for monitoring in remote locations, as it may provide a compact, self-contained, and easily transportable unit. Such a configuration may be advantageous to provide a unit that is easily set up on site, while providing a multi-gas (i.e. multi-constituent) detection capability.

FIG. 1b shows an exploded view of aspects of a camera module with a fluid reservoir 94 in accordance with the present disclosure. The camera module may include a camera 80 in accordance with the present disclosure. The camera 80 generally includes an optical path 82, which may be directed towards a scene of interest during use. The camera module may include a faceplate 84 (also referred to herein as a window housing) oriented within the optical path 82 of the camera 80. The faceplate 84 may include one or more ports 86a-f connected in fluid communication to one or more fluid delivery lines 98a,b each in accordance with the present disclosure. One or more ports 86a-f may be connected to one or more of the fluid delivery lines 98a,b via a manifold 85 in accordance with the present disclosure. In aspects, the manifold 85 may be integrated into the faceplate 84.

In aspects, the faceplate 84 may be attached to the lens 88 of the camera 80 (or equivalently may include a lens/optical window for the associated camera 80). The faceplate 84 may include one or more gaskets, fasteners (e.g. screws, rivets, bondable regions, threaded interfaces, etc.) for interfacing with the camera, the camera lens assembly, or the like.

In aspects, the camera module may include a manifold 85 (optionally integrated into the camera 10, 80, the lens 15, 88, a faceplate 84, or the like), the manifold 85 including one or more fluid channels to direct fluid from one or more fluid delivery lines 98a,b to one or more ports 86a-f in the immediate vicinity of the lens 15, 88. In aspects, the manifold 85 may be formed from a molded polymer component, a metal plate, from a portion of the wall of the camera housing, etc. The manifold 85 may include one or more channels formed and/or otherwise machined therein to direct fluid there through. Such channels may be formed by a wide range of processes including trench machining, milling, drilling, routing, etching processes, injection molding, EDM, microfluidic processes, micro-molding processes, screen printing, rapid prototyping, combinations thereof, and the like.

In aspects, the manifold 85 may include an array of channels, each channel interconnecting a fluid deliver line 98a,b and/or one or more fluid connectors 87a,b with one or more of the ports 86a-f The manifold 85 may be molded into the camera housing, integrated into a faceplate 84, provided as a component of the camera housing, two part molded, micromolded, etc.

The camera module may include one or more electrical circuits configured to control one or more aspects of the camera (sensors, alignment lighting, reference lights, cooling system, ambient lighting sensors, ambient condition sensors, etc.), image processing circuitry, the cleaning system (e.g. fluid delivery valves, fluid uptake valves, fluid filtering processes, etc.), and/or one or more aspects of a servo-actuation system (e.g. for use in an articulated configuration).

The camera module may include a camera housing 90 (the bottom of which is shown in the figure), the housing 90 configured to enclose and/or isolate one or more components of the camera module from the surrounding environment.

The non-limiting example shown in FIG. 1b may include a fluid control system 92 and a reservoir 94 each in accordance with the present disclosure. The fluid control system 92 may include one or more pumps, compressors, filters, vents, valves, electronic circuits, combinations thereof, or the like configured to collectively control fluid delivery along one or more of the fluid delivery lines to the ports 86a-f during use. The reservoir 94 may be configured to store a fluid (e.g. a liquid, a gas, etc.) for use by the fluid control system 92.

In aspects, the reservoir 94 may be configured to retain a liquid (e.g. water, deionized water, ultrapure water, a cleaning solution, a surfactant, a detergent, etc.), and/or a gas (e.g. dry air, nitrogen gas, carbon dioxide gas, etc.). The fluid control system 92 may be configured to deliver a bolus of liquid from the reservoir 94 to the associated fluid delivery line(s) 98a,b during a cleaning operation. In aspects, the reservoir 94 may include a heating element and/or insulation so as to maintain the fluid contained therein at a temperature, perhaps different, than that of the surrounding environment.

In aspects, the reservoir 94 may be configured to contain a supplemental fluid (e.g. a surfactant, a detergent, etc.) for combination with a fluid source (e.g. a water source, a solvent source, etc.). In such aspects, the fluid control system 92 may include one or more mixing chambers, static mixers, microfluidic mixing components, or the like to combine the supplemental fluid with the source fluid during deliver to one or more associated ports. In aspects, the mixer may be configured to accept two or more streams of fluids (e.g. a fluid from a fluid source, a supplemental fluid, water, etc.) into a static mixing chamber. As the streams move through the mixer, the non-moving elements continuously blend the streams into a substantially mixed output stream. Complete mixing depends on many variables including the fluids' properties, tube inner diameter, number of elements and their design.

In aspects, the reservoir 94 may be configured as an interchange able component. Such a configuration may be advantageous for use in applications where a fluid source and/or supplemental fluid may not be available, or may be inconvenient to implement, etc.

In aspects, the fluid control system 92 and/or the reservoir 94 may include a gas port 96, perhaps connected to the local ambient environment. The gas port 96 may include a particle filter, an air drying cartridge, etc. so as to condition gas (e.g. air) entrained by the fluid control system 92 during use. The fluid control system 92 may include a compressor in fluid communication with the gas port 96 configured to draw gas from the surroundings into the camera module during operation. Such a configuration may be advantageous for easily providing a gas to one or more of the ports 86a-f during operation.

In aspects the gas port 96 may include an interchange able cartridge for filtering particles, oil, contaminates, bacteria, moisture, combinations thereof and the like from gas drawn into the camera module during use. The fluid control system 92 may include a pressure and/or flow sensor configured to determine when an associated cartridge is sufficiently used up so as to be beneficially interchanged with a new cartridge.

In aspects wherein the camera module includes an infrared camera, the lens (equivalently window) may be constructed from a range of materials including germanium, calcium fluoride, sapphire, lithium fluoride, zinc selenide, barium fluoride, IR transmitting polymers, etc. The fluids may be selected so as to minimize corrosion of the lens 88 during operation (i.e. reduction of erosion of the lens surface, reduction of chemical attach of the lens surface, etc.).

In aspects, a cartridge in accordance with the present disclosure included in the camera module, the fluid control system 92, and/or the reservoir 94, may include a softener configured so as to remove or neutralize cationic species present in the liquid source.

In aspects, a microfluidic mixing arrangement may include a Y-channel mixer, serpentine mixer, vortex mixer, combinations thereof, or the like. The microfluidic mixer may be included in the fluid control system 92, as part of a fluid delivery line 98*a-b*, integrated into a faceplate 84, and/or into a lens/window 88 in accordance with the present disclosure.

In aspects, the channels included in the manifold 85 may be configured so as to substantially minimize the dead space contained therein. Such a configuration may be advantageous for limiting the fluid and/or the power required to clean the lens 15, 80 and or an aspect of the camera module.

Figure 2:
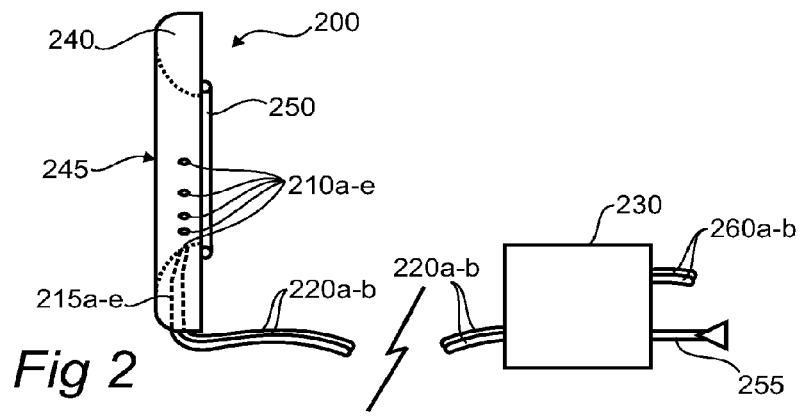
FIG. 2 shows aspects of a window assembly and an associated cleaning control system in accordance with the present disclosure.

FIG. 2 shows aspects of a window assembly 200 (i.e. a faceplate/window housing) and associated cleaning control system in accordance with the present disclosure. The window assembly 200 may be attached to a camera or camera housing to form a self-cleaning camera module. Such a configuration may be advantageous for retrofitting a camera for use in an uncontrolled environment. The window assembly 200 includes one or more ports 210*a-e* and one or more channels 215*a-e*, the channels 215*a-e* in fluid communication with one or more of the ports 210*a-e*. The window assembly 200 may further include or include means for connecting one or more of the channels 215*a-e* and/or ports 210*a-e* to one or more fluid delivery lines 220*a-b* in accordance with the present disclosure.

The fluid delivery lines 220*a-b* may be connected to a fluid control system 230 in accordance with the present disclosure. The fluid control system 230 may include one or more valves, pumps, compressors, mixers, filters, canisters, and the like each in accordance with the present disclosure. The fluid control system 230 may be connected to one or more power and/or control lines 255, to provide a power signal to the fluid control system 230 and/or communicate data (i.e. control signals, sensory signals, etc.) between the fluid control system 230 and an external entity (not explicitly shown). The fluid control system 230 may include one or more connectors and/or lines 260*a-b* for connecting the fluid control system 230 to a fluid source (e.g. a liquid source, a water source, a gas source, etc.).

In aspects, one or more of the ports 210*a-e* may be configured with a nozzle (e.g. an atomizer, micro-nozzle, MEMs nozzle, plain orifice, shaped orifice, pressure-swirl, cone type nozzles, spray heads, etc.) so as to guide, atomize, and/or form the flow of a fluid towards the lens/window pane and/or the outer surface 245 of the window assembly 200. In aspects, one or more ports 210*a-e* may include a nozzle formed from a reduction in cross sectional area between an inlet channel (i.e. a channel 215*a-e*, a delivery line 220*a-b*, etc.) and the port 210*a-e*, the nozzle configured to produce a spray jet of fluid towards the lens/window region/aperture and/or the outer surface 245 of the window assembly 200. One or more of the ports 210*a-e* may be connected to one or more of the channels 215*a-e* or delivery lines 220*a-b* in a 1 to 1 or unbalanced configuration. In one non-limiting example, a plurality of ports 210*a-e* may be connected to a single channel 215*a-e*, and/or a plurality of channels 215*a-e* may be connected to a single fluid delivery line 220*a-b*.

In aspects, the window assembly 200 may be modeled into a single component 240 into which embedded channels 215*a-e* and/or ports 210*a-e* may be formed (i.e. during the molding process and/or via a post molding process).

The window assembly 200 may include a lens/window pane (not explicitly shown) in accordance with the present disclosure. Alternatively, additionally, or in combination window assembly 200 may include a gasket 250 configured so as to form a seal against a corresponding camera housing, when the window assembly 200 is mounted thereupon.

In aspects, the window assembly may include an electrospray component. The electrospray component may include a plurality of micro-nozzles (i.e. integrated into one or more ports 210*a-e*), connected to one or more of the channels 215*a-e*. The electrospray component may include two or more electrodes configured to generate a voltage across one or more of the micro-nozzles during use. A micro-nozzle may be provided with an equivalent internal diameter of less than 1 mm, less than 200 um, less than 40 um, less than 10 um. One or more micro-nozzles may be configured with a general, circular, elliptical, rectangular, etc. cross sectional area. The electrospray component may include more than 1 micro-nozzle, more than 10 micro-nozzles, more than 500 micro-nozzles, etc. One electrode may be configured internally to one or more channels 215*a-e*, behind one or more micro-nozzles, while a second electrode may be configured externally to the micro-nozzles, optionally against a surface of a lens/window in accordance with the present disclosure. In one non-limiting application, the lens/window or a surface thereupon may be configured with an electrode for use with the electrospray component.

In aspects, the lens/window may be electrically charged so as to repel liked charged species, repel or attract cleaning fluid species, etc. Such electrical charging may be induced by an associated circuit, and optionally modulated, etc. perhaps during a cleaning procedure, between cleaning procedures, etc.

In aspects, a camera module and/or window assembly 200 in accordance with the present disclosure, may include a test circuit configured to electrify the lens/window to determine the state of cleanliness thereof. The test circuit may be configured to deliver a voltage between the lens/window and an adjacent electrode (e.g. optionally an electrospray electrode), and to monitor one or more aspects of a test signal (e.g. an associated current, impedance, electromotive potential, etc.), in order to assess the state of cleanliness thereof. A cleaning control algorithm may be implemented to initiate a cleaning procedure when one or more of the test signals exceed a threshold value. Additionally, alternatively, or in combination one or more images retrieved by the camera may be used to assess the cleanliness of the lens/window. The image maybe assessed for signs of grime. In the case of a thermal imaging camera, grime may be determined by regions of unusually stable temperature profile within the images obtained by the camera. Additionally, a cleanliness test algorithm may be implemented that analyzes the images obtained from the thermal imaging camera before and/or after providing a jet of fluid to the lens (i.e. perhaps of an increased or decreased temperature relative to the lens). As the thermal image of the surroundings would not likely change substantially in such a short timeframe, any regions of the image that change temperature dramatically during the test may be considered attached to the lens (i.e. grime). If a threshold level of such material is determined on the lens, a complete cleaning procedure may be initialized by the camera control system (or requested from a supervising control system), etc.

FIGS. 3*a-f* show aspects of faceplates (also referred to herein as window housings) in accordance with the present disclosure.

Figure 3A:
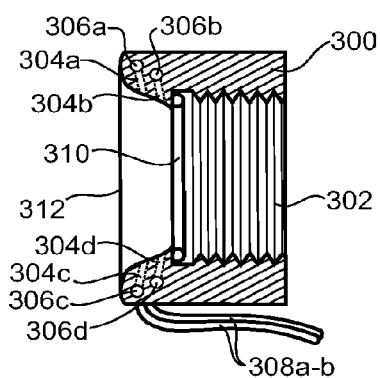
FIGS. 3a-f show aspects of face plates in accordance with the present disclosure.

FIG. 3*a* shows a threaded faceplate 300 configured for attachment to a camera. The treaded faceplate includes a threaded connector 302 configured to helically attach to a mating threaded component on the camera (e.g. a threaded lens assembly included on the camera). The threaded faceplate 300 may include one or more ports 304a-d and one or more channels 306a-d. Each port 304a-d may be connected with one or more of the channels 306a-d. The threaded faceplate 300 may include connectors in fluid communication with the channels 306a-d, and/or may be configured in direct connection to one or more fluid delivery lines 308a-b. One or more ports 304a-d may be configured so as to provide fluid flow onto an outer surface 312 of the threaded faceplate 300 or into the window region/aperture of an attached camera lens. The fluid delivery lines 308a-b may be connected to a fluid control system in accordance with the present disclosure.

In aspects, a faceplate in accordance with the present disclosure may include one or more gaskets 310. The gaskets 310 may be configured so as to provide a seal between the faceplate 300 and a camera, against two or more components within the faceplate 300, as a way to separate regions of the faceplates 300, as a way to isolate channels within a faceplate 300, as a way to separate channels 306a-d associated with different fluids in the faceplate 300, combinations thereof and the like. The gaskets 310 may be formed from a rubber material, a screen printed polymer, a dispensed polymer, etc. The gaskets 310 may be formed in place, preformed, set into grooves on the faceplate 300, etc.

In aspects, a faceplate 300 in accordance with the present disclosure may include a printed gasket 310, the printed gasket 310 patterned so as to form and/or isolate a channel 306a-d, between a fluid delivery line 308a-b, and/or one or more ports 304a-d. A printed gasket 310 may be formed by a dispensing operation, a molding operation, a printing operation, combinations thereof, or the like.

Figure 3B:
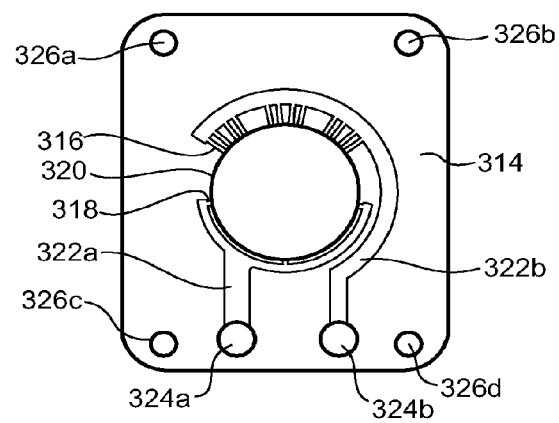

FIG. 3b shows a faceplate 314 in accordance with the present disclosure. The faceplate 314 includes a plurality of ports 316, 318 and/or port arrays for delivering a fluid (e.g. a liquid, a gas, etc.) to a lens/window in accordance with the present disclosure. The ports 316, 318 may be arranged along a perimeter 320 of the window/aperture or portion thereof (e.g. in a substantially cyclic fashion, arranged along a preferred side of the window, provided so as to compliment gravity based cleaning of the window/lens, etc.). The ports 316, 318 may be oriented in the plane of the faceplate 314, or out of the plane of the faceplate 314 so as to better direct flow of fluid therefrom (e.g. towards the window/lens, across the window/lens, along a gravity vector, forming a protective region, etc.). The faceplate 314 may include one or more fluid delivery lines 324a-b and/or means for connecting fluid delivery lines 324a-b to one or more channels 322a,b included in the faceplate 314.

The faceplate 314 may include mounting points 326a-d for connecting the faceplate 314 to an associated camera housing, camera, etc. Additionally, alternatively, or in combination, the faceplate 314 may be directly integrated into the camera housing, camera, etc. during the manufacturing and/or assembly process.

In aspects, fluid may be delivered independently to one or more channels 322a-b, of the faceplate 314 during operation. The channels 322a-b may be separated into multiple sets (channel set a 322a, channel set b 322b, etc.) such that alternative flow profiles, alternative fluids, etc. may be directed towards the window region during the cleaning process. Such channel sets 322a, 322b, may be advantageous for selectively cleaning a window region during a multiple step cleaning process.

In aspects, the ports 316, 318 may be configured to direct fluid in a general shape (e.g. as a cone, dome, cascade, sheet, etc.) over the window, but not directly towards the window (i.e. so as to form a protective current between the window perimeter 320 and the surrounding environment). Such a fluid curtain may be used to protect the lens/window from the surrounding environment during a cleaning process or immediately thereafter (e.g. while it is still moist from a cleaning procedure, etc.). Such a fluid sheet may be formed from an array of micro-nozzle based ports, a slotted port, combinations thereof, or the like.

Figure 3C:
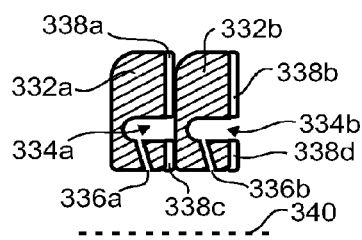

FIG. 3c shows an aspect of a multi-layered faceplate (ML faceplate 330) in accordance with the present disclosure. The ML faceplate 330 may be configured with one or more members 322a,b (e.g. plates, inserts, features, etc.) that may be configured to collectively form one or more channels 334a-b, ports 336a-b, and/or fluid delivery connectors/lines. One or more of the members 322a-b may be configured with inset channels, intermeshing channels (i.e. channels arranged to pass from one adjacent member to another), etc. In aspects, one or more members 322a-b may include a formed channel 334a-b configured for delivery of fluid to the window area. The ML faceplate 330 may be configured with one or more reference markers, attachment features, registration pins, etc. so as to provide simplified alignment to a camera, or associated camera housing. One or more members 322a-b may include one or more ports 336a-b to direct the flow of fluid towards the window area, over the window area, etc. One or more members 322a-b may include a gasket 338a-d in accordance with the present disclosure. The gasket 338a-d may be configured so as to direct fluid flow through the formed channels 334a-b as well as to prevent fluid leakage between the members 332a-b during use.

Optionally, the faceplate 330 may be substantially symmetrically positioned about a symmetry axis 340. In such a configuration, one or more ports 336a-b may be configured in an asymmetrical pattern about the axis 340 so as to prevent flow provided there through from pooling on the lens/window of the associated camera.

Figure 3D:
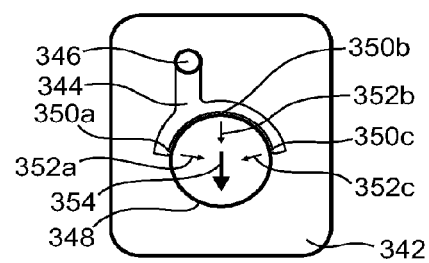

FIG. 3d shows a shared line faceplate 342 in accordance with the present disclosure. The shared line faceplate 342 may include a channel 344 and a plurality of ports 350a-c, collectively configured to deliver a fluid from a fluid delivery line 346 to a window region/aperture 348 (i.e. a region adjacent to an associated window and/or lens, an aperture, etc.). The channel 344 and associated ports 350a-c may be configured for delivery of fluid to the window region 348 in a pattern that is perhaps preferential for the cleaning thereof. In one non-limiting example, the channel 344 and associated ports 350a-c may be configured to deliver fluid to one side of the perimeter of the window region 348 so as to preferentially guide the fluid across the window region 348 while performing a cleaning procedure. The channel 344 and associated ports 350a-c may be configured to carry one or more fluids (e.g. liquid, gas, cleaning solution, etc.) serially and/or in combination so as to provide the necessary cleaning function to the window region 348.

The channel 344 may be connected with one or more ports 350a-c arranged in the immediate vicinity of the window region 348 (e.g. around the perimeter thereof, directed towards the center thereof, directed along the face thereof, etc.). One or more ports 350a-c may include a nozzle, a micro-nozzle, etc. in accordance with the present disclosure. Each port 350a-c may be configured so as to produce a local fluid jet 352a-c which may converge over the window region 348 to form a macro fluid jet 354 in a preferred direction across the window region 348 (e.g. along a gravity vector, towards a fluid trap, etc.).

In aspects, one or more fluid delivery lines 346 may be configured to facilitate delivery of a plurality of fluid types (e.g. gas, liquid, water, air, etc.) during a cleaning process. Such a configuration may be advantageous to simplify one or more aspects of the camera module.

In aspects, one or more channels 344 may be designated as primary channels and secondary channels. Primary channels may be configured to feed one or more secondary channels during a cleaning process. Thus the primary channels may have a larger cross section than the corresponding secondary channels. Such a configuration may be advantageous for maintaining a substantially high back pressure during the cleaning process (i.e. due to minimal head loss through the primary channels). In such aspects, the primary channels may fluidly connect one or more secondary channels to one or more fluid delivery lines 346. The secondary channels may connect one or more ports 350a-c to one or more primary channels.

Figure 3E:
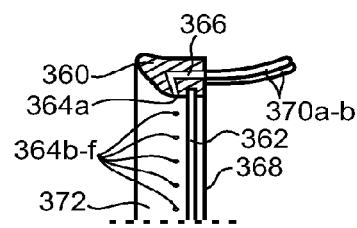

FIG. 3e shows a snap ring based faceplate 360 in accordance with the present disclosure. The snap ring faceplate 360 may be configured so as to click-ably attach to the lens holder on an existing camera via an embedded interlocking feature 362. The snap ring faceplate 360 may include one or more ports 364a-f connected to one or more channels 366 (i.e. primary channels, secondary channels, etc.). The snap ring faceplate 360 may be fabricated in one or more parts, a one part snap ring faceplate 360 may include one or more molded channels 366 or portions thereof. A multi-part snap ring faceplate 360 may include one or more channels 366 formed by mating together parts of the multi-part snap ring faceplates 360. The channels 366 may be configured with a means for connecting (e.g. a connector, a fitting, a socket, an accepting surface, etc.) the channel 366 to a fluid delivery line 370a-b so as to accept a fluid from a fluid source during a cleaning procedure.

In aspects, the snap ring faceplate 360 may include a window (not explicitly shown, but generally abutted to a sealing face 368 included in the faceplate 360), such that the original lens of the camera may be encapsulated and/or sealed via attachment of the snap ring faceplate 360 to the camera. The self-cleaning aspects of the camera module may be focused onto the window instead of directly onto the lens of the camera. Such a seal may be formed along a sealing face 368 of the faceplate 360. One or more ports 264a-f in accordance with the present disclosure may be configured to direct flow of a fluid over the outwardly facing surface 372 of the faceplate 360 during operation.

In aspects, the faceplate 300, 314, 330, 342, 360 (e.g. a snap ring based, threaded, etc.) may be configured as or include in a lens hood, a protective cover in accordance with the present disclosure, a snap plate, a shroud, combinations thereof, or the like. Such a configuration may be advantageous to provide self-cleaning as well as lighting control for a camera in accordance with the present disclosure. Inclusion of a protective cover may be advantageous for offering an additional isolation for the lens/window during times when the camera is not in use.

Figure 3F:
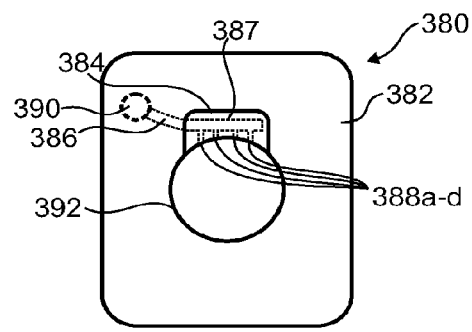

FIG. 3f shows a faceplate 380 in accordance with the present disclosure including a backplate 382 and an insert 384. The insert 384 and the backplate 382 may each include one or more channels 386, 387, and/or ports 388a-d. The insert 384 may be configured to interlock with the backplate 382. One or more of the insert channels 387 may be arranged to interface with one or more channels 386 in the backplate 382. One or more backplate channels 386 may be configured to interface with a fluid delivery line 390 in accordance with the present disclosure. One or more of the ports 388a-d may be arranged in the vicinity of the window region 392 so as to more easily facilitate cleaning thereof.

In aspects, a faceplate in accordance with the present disclosure may include a protective cover (e.g. a shutter, a flip cap, an actuated cover plate, etc.). The protective cover may be attached to the faceplate and arranged so as to cover the window/lens when in a closed position. The protective cover and/or the camera module may include an actuator so as to controllably orient the protective cover in one or more positions, and/or to open and close the protective cover as needed by an associated camera module. The protective cover and/or the camera module may include one or more sensors to convey a position thereof to a controller, etc. The shutter may be advantageous for physically isolating one or more aspects of the lens/window from a surrounding environment when the camera module is not actively scanning for targets, analyzing a target, observing a scene, collecting an image/video, etc.

In aspects, a camera module in accordance with the present disclosure, equipped with a protective cover, may include an additional camera unit, the additional camera unit configured to monitor an environment to determine if a target is within range for further analysis. The camera module may be configured to analyze information from the additional camera and to open or close the shutter accordingly (e.g. to open the shutter if a target is within range, to close a shutter if no target is in range, etc.).

Figure 4A:
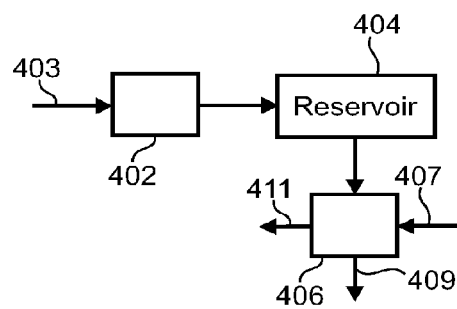
FIGS. 4a-d show aspects of schematics of a self-cleaning camera module in accordance with the present disclosure.

FIGS. 4a-d show aspects of schematics of a self-cleaning camera module in accordance with the present disclosure. FIG. 4a shows a schematic view of an aspect of a fluid control system in accordance with the present disclosure. The fluid control system includes a source port 402 configured to interface with a fluid source 403 to receive and/or draw a fluid from the fluid source 403. The fluid control system may include a reservoir 404 in fluid communication with the source port 402 configured to store a quantity of the received fluid. The source port 402 may include an optional prefilter to remove contaminants (e.g. dust, particulates, oil, etc.) from the fluid. The source port 402 may include a pump to draw the fluid into the reservoir 404, to pressurize the fluid within the reservoir 404, etc. The fluid control system may include one or more control elements (e.g. valves, pumps, mixers, agitators, etc.) configured to receive a control signal 407 from a controller, to receive fluid from the reservoir 404, and to deliver fluid to the surface 409. The control element (e.g. a pump and/or valve) may be configured to deliver fluid to a vent 411 (e.g. so as to purge the system, relieve pressure during operation, exchange fluid with the surroundings, etc.).

Figure 4B:
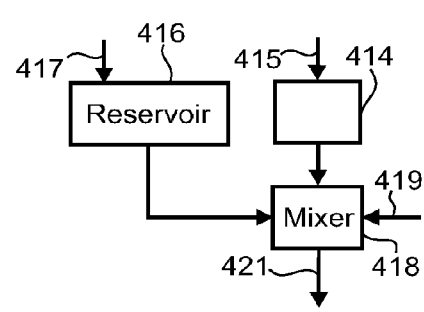

FIG. 4b shows an aspect of a fluid control system in accordance with the present disclosure including a source port 414 configured to receive a fluid from a fluid source 415 and a reservoir 416, the reservoir configured to store a second fluid (e.g. a cleaning solution, a surfactant, an additive, etc.) optionally obtained from a second fluid source 417. The fluid control system may include a mixer 418 configured to receive a control signal 419 from a controller, and configured to selectively mix the fluid from the fluid source 415 (optionally treated in the source port 414) with the second fluid obtained from the reservoir 416 during a cleaning procedure.

In aspects, the mixer 418 may be configured to mix the source fluid with the second fluid with various mixing ratios, varying mixing ratios, etc. before, during, and/or after the cleaning procedure.

In aspects, the source fluid may be water, and the second fluid may be a liquid detergent. The mixer 418 is configured to mix a portion of the liquid detergent into the water with a ratio of 1:1000, 1:100, 1:10, or the like (e.g. perhaps as controlled by a valve associated with the mixer 418, a pump associated with the mixer 418, a control surface associated with the mixer 418, via the natural mechanical makeup of the mixer 418, etc.).

In aspects, the mixer 418 may be configured to mix the source fluid and the second fluid in differing ratios during the cleaning process. In a first step, the mixer 418 may be configured to produce a cleaning fluid consisting essentially of the source fluid, in a second step, the mixer 418 may be configured to produce a cleaning fluid consisting essentially of a 1:10 mix of second fluid to source fluid, in a third step, the mixer 418 may be configured to produce a cleaning fluid consisting essentially of the source fluid. Additionally, alternatively, or in combination, the fluid control system may be configured to deliver a gas (e.g. air, dry air) to the surface during the cleaning process (e.g. in the above example, perhaps as a fourth step). In aspects, the source port 414 may include an optional prefilter to remove contaminants (e.g. dust, particulates, oil, etc.) from the fluid.

Figure 4C:
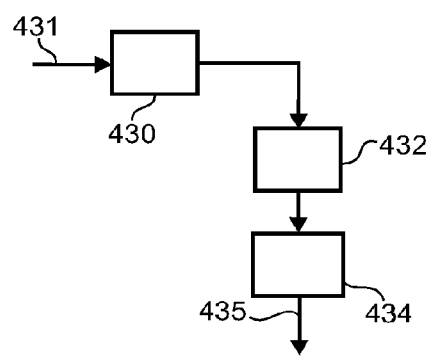

FIG. 4c shows aspects of a fluid control system in accordance with the present disclosure. The fluid control system includes a prefilter 430 and/or compressor configured to receive fluid from a gas source 431 (e.g. from ambient air, from a pressurized airline, etc.). The fluid control system may include an accumulator 432 in fluid connection with the prefilter and/or a compressor configured to store at least a portion of the received gas. The fluid control system may include a control element 434 (e.g. a valve, a servo valve, a manifold, etc.) configured to receive a control signal from a controller and to deliver gas to a surface 435 (i.e. into a fluid delivery line, a channel, to a port, etc.). The fluid control system may include a dryer, a fine particle filter, a bacterial filter, etc. (i.e. included in the prefilter 430, the accumulator 432, the control element 434, etc.) so as to condition the received gas before it is delivered to the surface to be cleaned.

Figure 4D:
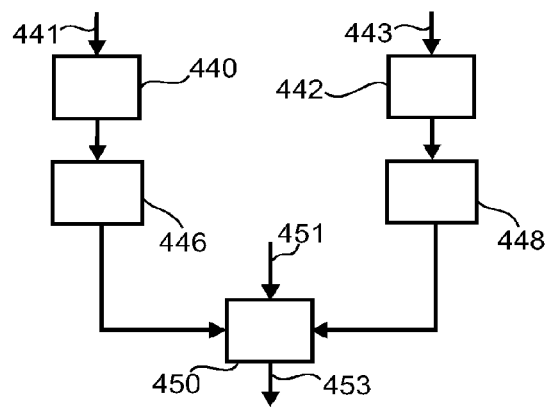

FIG. 4d shows an aspect of a fluid control system in accordance with the present disclosure including a gas source port 440 and a liquid source port 442, each configured to receive a fluid (e.g. a gas, a liquid) from an associated fluid source 441, 443 respectively and/or the control element 434. The fluid control system optionally includes a gas reservoir 446 (e.g. an accumulator), and/or a liquid reservoir 448 (e.g. to store liquid). The reservoirs 446, 448 may be configured to store fluid (optionally pressurized fluid) as obtained from the respective fluid source 441, 443. The fluid control system may include a mixer 450 configured to receive a control signal from a controller 451, and configured to selectively mix and/or sequentially deliver the gas from the gas source 441 with the liquid from the liquid source 443 to deliver mixed fluid to a surface 453 in accordance with the present disclosure (i.e. included in the faceplate, camera lens, etc.) during a cleaning procedure. The mixer 450 may include an optional warming element to control the temperature of the mixed fluid as it is delivered to the surface.

In aspects, the fluids from the gas source and from the liquid source may be sequentially applied to the surface, via one or more fluid delivery lines in accordance with the present disclosure. In aspects, the fluid delivery lines may be configured so as to carry individual fluids to the surface.

In aspects, the mixer 450 may be configured to sequentially deliver gas and fluid to the surface during a cleaning procedure. In one non-limiting example, the mixer 450 may be configured to deliver fluid and then gas to the surface along a signal fluid delivery line. Such a configuration may be advantageous to reduce the number of channels and/or ports in an associated faceplate, to reduce overall system complexity, and/or to reduce the amount of liquid that may sit in the fluid delivery line during storage and/or between cleaning procedures (i.e. so as to reduce corrosion, bacterial growth, reduce hard water deposit formation, etc.). In aspects including a shared fluid delivery line, gas may be used to remove residual liquid from the line after a cleaning process. Such gas purging of the fluid delivery line may be advantageous for minimizing the residual moisture in the lines, preventing freezing of the liquid in the lines, preventing leakage from the lines, etc. during use.

In aspects, even in a camera module including dedicated gas and liquid delivery lines, the fluid control system may be configured to drive gas through the liquid line(s) during the last step of the cleaning process.

In aspects, the fluid control system may include a filter to substantially remove dust, oil, grim, etc. from the source fluid. This configuration may be advantageous to minimize buildup of scale and minerals on the surface between cleaning procedures.

In aspects, the fluid control system may include a softener, and ion-exchange column optionally with an ion exchange medium (e.g. an ion exchange resin, zeolites, anionic functional groups in polymers, etc.), or a softening process (i.e. a flash boiler, chelation, regeneration, etc.) to remove or neutralize multivalent cations (e.g. magnesium, calcium, calcium carbonates, salts, etc.) from the source fluid (e.g. water, hard water, etc.) so as to minimize sedimentation of scale onto one or more aspects of the lens, faceplate, camera module, etc.

In aspects the fluid control system may include an interchange able cartridge for filtering particles, oil, contaminates, bacteria, moisture, combinations thereof, and the like from source fluid drawn into the camera module during use. The fluid control system may include a pressure and/or flow sensor configured to determine when an associated cartridge is sufficiently used so as to be beneficially interchanged with a new cartridge.

Figure 5:
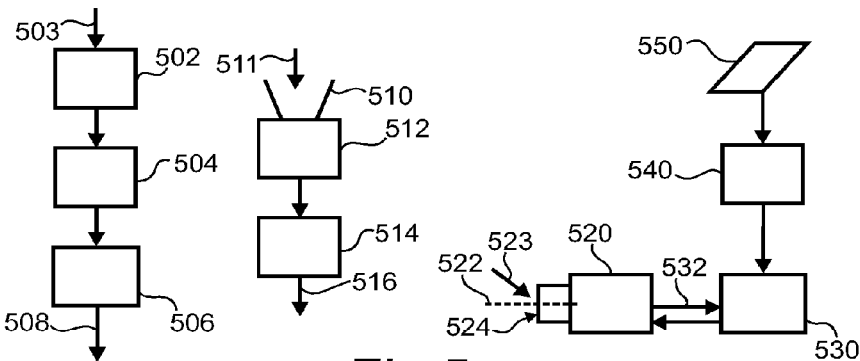
FIG. 5 shows a schematic of a self-contained camera module in accordance with the present disclosure for use in a remote application.

FIG. 5 shows a schematic of a self-contained camera module in accordance with the present disclosure for use in a remote application. The self-contained camera module may be configured for use in a wilderness setting for example, or a site without easy access to traditional fluid and/or power sources. In aspects, the self-contained camera module may include a fluid control system for managing gas in accordance with the present disclosure. The fluid control system may include a filter or microcompressor 502 for drawing a gas 503 from the ambient air and storing the gas in a gas reservoir 504 (e.g. an accumulator). The fluid control system may include a valve and/or compressor connected to a controller 506, to the gas reservoir, and to one or more fluid delivery lines 508. The controller may be configured to deliver gas to the fluid delivery lines (i.e. and ultimately to the window/lens). One or more fluid delivery lines 508 may be directed towards an associated surface to be cleaned.

The self-contained camera module may include a fluid control system for handling liquids during use. The fluid control system may include a collection device 510 configured to capture fluid 511 from the surroundings (e.g. via a rain collection reservoir, via a moisture trap, etc.) and store the fluid in a reservoir 512. The fluid control system may include one or more conditioning elements 514 (e.g. filters, water softeners, antibacterial treatment aspects, etc.) configured to further remove impurities from the fluid before delivery to the surface to be cleaned (e.g. the window/lens).

The self-contained camera module may include a fluid delivery line 516 directed towards 523 the surface 524 to be cleaned.

In aspects, the gas source and the liquid source may be a gas cartridge and a cleaning solution reservoir respectively. The cartridge and/or reservoir may be a replaceable, removeable, and/or disposable element.

The camera module may include a camera 520 with an optical path 522 and a window/lens 524, which may require periodic cleaning during use. The camera module may include a control system 530 connected to the camera 520 via one or more electrical interconnects 532, configured to control the camera, condition data obtained from the camera 520, etc. The camera module may include a power source 540 (e.g. a battery, a fuel cell, a nuclear power source, etc.) and optionally an energy harvesting device 550 (e.g. a solar panel, a windmill, a generator, etc.).

In aspects, a camera module in accordance with the present disclosure may include a radio, wireless module, or the like to communicate data with an overseer (e.g. an automatic control system, an observation station, a command center, a base station, a livestock management system, a surveillance system, etc.).

In aspects, the camera module may be portable and/or deployable (i.e. as part of a military operation, a wildlife monitoring application, launch able from an aircraft, etc.). The camera module may be entirely self-contained such that it can continue to operate for a period of time after deployment without a pressurized fluid source, or an external power source.

Figure 6A:
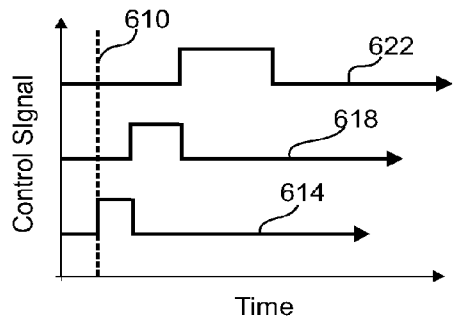
FIGS. 6a-b show control timing diagrams for implementation on a self-cleaning camera module in accordance with the present disclosure.
Figure 6B:
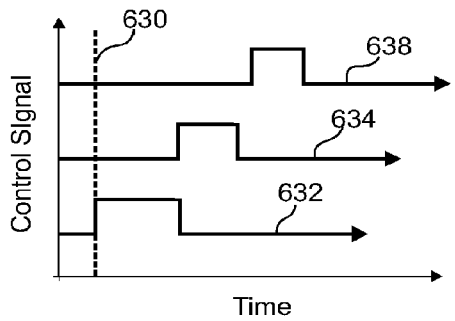

FIGS. 6a-b show non-limiting examples of control timing diagrams for implementation on a self-cleaning camera module in accordance with the present disclosure. FIG. 6a shows a time series representation of the control signals demonstrating a cleaning start time marker 610 (perhaps as provided to a fluid control system so as to prime the fluid delivery system, engage a compressor, begin a fluid conditioning process 614, etc.). The cleaning start time marker 610 may be initiated by a cleaning control algorithm, a user input, external surveillance camera, etc. The next sequence may include a fluid delivery control signal 618 to control delivery of fluid to the window/lens. The final sequence as shown in FIG. 6a may include a gas delivery control signal 622 to initiate and control delivery of a gas, perhaps to clean and/or dry the window/lens.

FIG. 6b shows a time series representation of the control signals for cleaning a window/lens in a camera module including starting the cleaning process 630, initiating fluid delivery 632 (i.e. so as to clean the window/lens), initiating delivery of a first gas 634 (i.e. to begin a fluid removal process, to direct fluid in a first direction, to dry a first portion of the window/lens, to direct fluid to a first set of ports, etc.), and initiating delivery of a second gas 638 (i.e. to complete a fluid removal process, to direct fluid in a second direction, to dry a second portion of the window/lens, to direct fluid to a second set of ports, etc.) to the window/lens.

In aspects, the controller may be configured to selectively control fluid delivery, fluid trajectory profiles, to guide the blast off patterns of fluid from the lens, to control bead breakup during the cleaning process, to ensure substantially complete removal of cleaning fluid from the window/lens, etc. The direction and/or strength of the flow may change throughout the cleaning process.

Figure 7A:
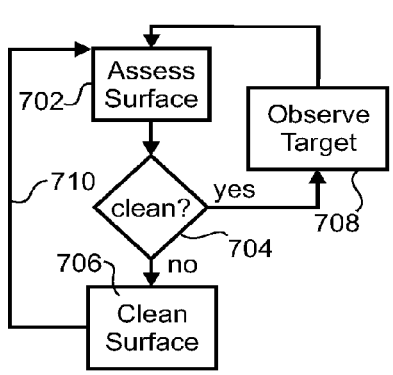
FIGS. 7a-b show methods for managing a self-cleaning camera module in accordance with the present disclosure.
Figure 7B:
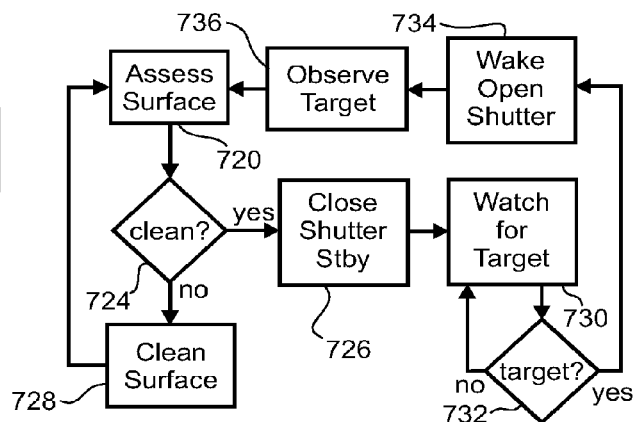

FIGS. 7a-b show methods for managing a self-cleaning camera module in accordance with the present disclosure. FIG. 7a shows a method including the steps of evaluating the cleanliness of the window 702, determining if cleaning is necessary 704, if so cleaning the window 706 in accordance with the present disclosure, if not continuing with operations 708 (e.g. observing a target, operating the camera, collecting one or more image and/or video, etc.). The method may include continuing with operations for a predetermined length of time before re-evaluating the cleanliness of the window/lens, monitoring for an event that may preclude the cleaning process, etc. The step of evaluating may include analyzing an image taken by a camera in accordance with the present disclosure and comparing with one or more aspects of a reference image (post cleaned image, reference clean image, averaged values from a range of images, a reference target in an image, etc.). One or more aspects of the evaluating process may include assessing a differential map of the absorption through a window along the optical path (e.g. to search for one or more sites of fouling on the window, etc.). The method may include a step of test cleaning (e.g. a burst of dry air, etc.). The method may include comparing an image before and after a cleaning or test cleaning process in order to determine if the cleaning process has been successful or not. The method may include repeating the cleaning process if a previous cleaning step was ineffective 710.

FIG. 7b shows a method for managing a self-cleaning camera module including the steps of evaluating the cleanliness of the window 720, determining if cleaning is necessary 724, if so cleaning the window 728 in accordance with the present disclosure, if not, closing a shutter (e.g. a protective cover in accordance with the present disclosure) and placing the camera module into standby 726. The method also includes watching for a target 730 (e.g. via a second camera system, a second camera module, a surveillance camera, etc.), waking and opening the shutter of the camera module 734 (e.g. upon sighting of the target, upon proper placement of the target in the field of view of the camera module, etc.), continuing with operations 736 (e.g. observing a target, operating the camera, collecting one or more image and/or video, etc.).

In aspects, the step of watching for a target 730 may be performed by one or more sensing means (e.g. an RFID locating system, a pyrometer, an ultrasonic sensor, a light curtain, etc.). The sensing means may trigger a signal for the camera to wake-up and continue operations when a suitable target 730 is detected in range. In one non-limiting example, the target 730 may be an animal (e.g. a cow, a sheep, a lamb, a pig, etc.) equipped with an RFID tag. A RFID tag reader may be positioned near to the camera modules such that as a target moves within range of the reader, the camera may awaken and continue with operations (i.e. assessing cleanliness, obtaining a reading, etc.).

The method may include continuing with operations for a predetermined length of time before re-evaluating the cleanliness of the window/lens, monitoring for an event that may preclude the cleaning process, etc. The step of evaluating may include analyzing an image taken by a camera in accordance with the present disclosure and comparing with one or more aspects of a reference image (post cleaned image, reference clean image, averaged values from a range of images, a reference target in an image, etc.). One or more aspects of the evaluating process may include assessing a differential map of the absorption through a window along the optical path (e.g. to search for one or more sites of fouling on the window, etc.). The method may include a step of test cleaning (e.g. a burst of dry air, etc.). The method may include comparing an image before and after a cleaning or test cleaning process in order to determine if the cleaning process has been successful or not. The method may include repeating the cleaning process if a previous cleaning step 728 was ineffective.

The method may include one or more of steps assessing energy reserves, assessing fluid reserves, scheduling maintenance, combinations thereof, and the like.

The method may also include analyzing the images received from the cameras to determine if a cleaning operation should be suspended until a more appropriate time. Such cleaning aspects may be suspended when the system detects a suitable target (e.g. an animal, a gas leak, an active manufacturing line, etc.) in the field of view of one or more of the camera modules. Such suspension of cleaning may be performed until adequate analysis of the target can be completed and the associated camera module is free from more pressing matters (e.g. analyzing suitable targets, scanning for targets, etc.).

In aspects, the method may include assessing if the target is within range and, if so, suppressing cleaning operations until the target has left the field of view of the camera module, or a secondary camera module.

Figure 8:
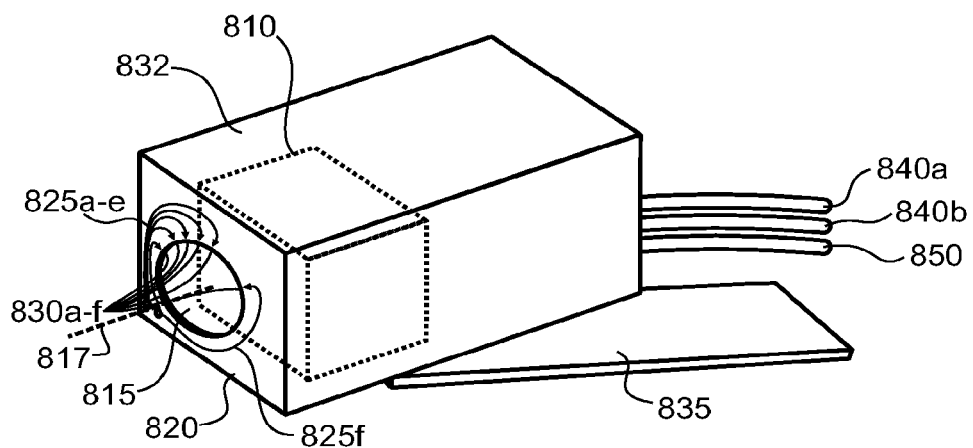
FIG. 8 shows aspects of a self-cleaning camera module in accordance with the present disclosure.

FIG. 8 shows aspects of a self-cleaning camera module in accordance with the present disclosure. The self-cleaning camera module may include a camera 810 with one or more lenses and/or windows 815. The self-cleaning camera module may include a lens or window 815 along the optical path 817 of the camera 810 that may require occasional cleaning (the region around the window/lens being referred herein as the surface). The self-cleaning camera module may include a faceplate 820 and a fluid control system (not explicitly shown) each in accordance with the present disclosure. The camera module may include a housing 832 connected to the faceplate 820. The faceplate 820 includes one or more channels 825a-f and ports 830a-f each in accordance with the present disclosure, the ports 830a-f arranged around/over one or more regions of the window 815 (e.g. along one or more regions of the window, the perimeter of the window, etc.).

The camera module may include a mounting element 835 (e.g. a bracket, flange, gimbal, tripod, pole, etc.) for attaching it to a fixture in the monitoring environment. The mounting element 835 may include one or more actuators (e.g. motors, linear actuators, etc.) configured to adjust or position the camera module in an application setting. In aspects, the mounting element 835 may be configured to actuate the camera module along/about multiple degrees of freedom (e.g. x, y, z, pan, tilt, etc.). The camera module may include one or more fluid delivery lines 840a-b for connection to one or more fluid sources, and/or electrical interconnects 850 to communicate and/or provide power to the camera module during use.

Figure 9:
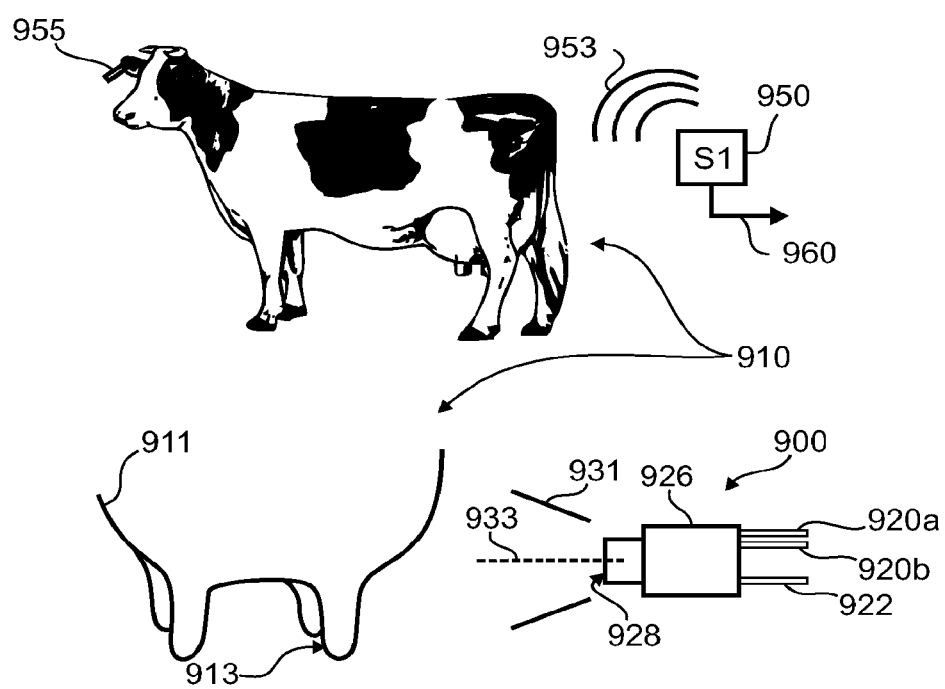
FIG. 9 shows a camera module in accordance with the present disclosure applied to a livestock monitoring application.

FIG. 9 shows a camera module 900 in accordance with the present disclosure applied to a livestock monitoring application. The camera module may be included in part of a livestock monitoring system in accordance with the present disclosure. The camera module may be positioned near to the flow of traffic, perhaps so as to register a spatially precise image from a target 910 (e.g. an animal, a cow, an udder 911, a teat 913, etc.). The camera module may include connectors to interconnect with a fluid source, and/or may include fluid supply lines 920a-b, to interconnect with a fluid source. The camera module may include one or more electrical interconnects 922 to provide power to the camera module and/or to communication data with an associated network, a host computer, a cloud based network, a cell phone, etc. each of which may be included in the monitoring system.

The self-cleaning camera module 900 may include a protective housing 926 and a surface 928 within the field of view 931 and optical path 933 of the camera module 900. The surface 928 may be cleanable via the self-cleaning system included in the camera module 900.

In aspects, a monitoring system including a self-cleaning camera module in accordance with the present disclosure may include one or more systems for detecting the presence of a target 910. Thus the system may include one or more sensing subsystems 950 (e.g. an RFID locating system, a pyrometer, an ultrasonic sensor, a light curtain, etc.) configured to locate and/or identify a target 910 within range of the camera module 900. The sensing subsystem 950 may be configured to communicate a target acquired signal 960, perhaps to the camera module 900 during use. In one non-limiting example, the target 910 may be an animal (e.g. a cow, a sheep, a lamb, a pig, etc.) equipped with an RFID tag 955. A RFID tag reader 950 may be positioned near to one or more camera modules 900 such that as a target 910 moves within range of the reader 950 (determined via broadcast and receipt of an RF signal 953 between the reader 950 and the tag 955), the reader is configured to communicate the control signal 960 to one or more entities in the monitoring system. Upon receipt of the control signal 960, the camera module 900 may be configured to awaken and continue with operations (i.e. assessing cleanliness, obtaining one or more reading, capture a video, etc.).

Figures 10A, 10B, 10C:
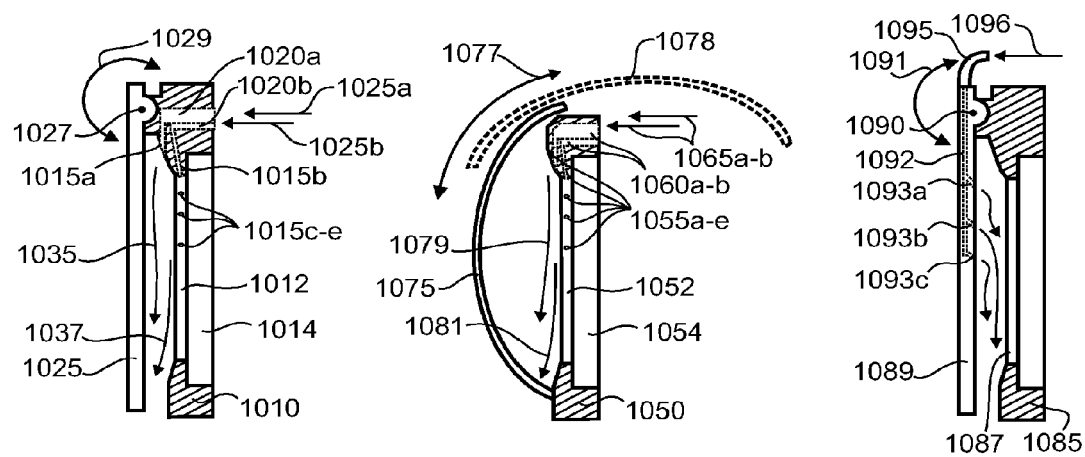
FIGS. 10a-c show aspects of a camera module including a protective cover in accordance with the present disclosure.

FIGS. 10a-c show aspects of a camera module including a protective cover in accordance with the present disclosure. FIG. 10a shows a faceplate (i.e. equivalently the front of a camera, a portion of a camera housing, etc.) including one or more self-cleaning features in accordance with the present disclosure. The faceplate includes a mounting plate 1010 including one or more channels 1020a-b, in fluid communication with one or more ports 1015a-e in accordance with the present disclosure. The channels 1020a-b may be configured so as to accept one or more fluids 1025a-b from associated fluid sources and/or fluid delivery lines in accordance with the present disclosure. The ports 1015a-e may be configured to direct flow of a fluid there through onto an outer surface 1012 of the faceplate, so as to provide a cleaning function during use. The faceplate may also include one or more interfacing features 1014 (i.e. equivalently an embedded window/lens in accordance with the present disclosure), for interfacing with an associated camera, optical window, lens, etc.

The faceplate may include a protective cover 1025 in accordance with the present disclosure. The protective cover 1025 may be oriented so as to protect at least a portion of the outer surface 1012 while provided in a first position (as shown). In the non-limiting example shown in FIG. 10a, the protective cover 1025 is attached to the mounting plate 1010 at a hinge 1027 about which the protective cover 1025 may be pivoted 1029 during use. The camera module and/or faceplate may include an actuation system (not explicitly shown) configured to actuate the protective cover 1025 so as to alter the orientation thereof during use (so as to selectively expose or cover at least a portion of the outer surface 1012 during use).

As shown in FIG. 10a, the protective cover 1025 may further be advantageous for directing the flow of one or more fluid jets 1035, 1037 along at least a portion of the outer surface 1012 during a cleaning, or test cleaning procedure in accordance with the present disclosure.

FIG. 10b shows a faceplate (i.e. equivalently the front portion of a camera, a portion of a camera housing, etc.) including one or more self-cleaning features in accordance with the present disclosure. The faceplate includes a mounting plate 1050 including one or more channels 1060*a-b*, in fluid communication with one or more ports 1055*a-e* in accordance with the present disclosure. The channels 1060*a-b* may be configured so as to accept one or more fluids 1065*a-b* from associated fluid sources and/or fluid delivery lines in accordance with the present disclosure. The ports 1055*a-e* may be configured to direct flow of a fluid there through onto an outer surface 1052 of the faceplate, so as to provide a cleaning function during use. The faceplate may also include one or more interfacing features 1054 (i.e. equivalently an embedded window/lens in accordance with the present disclosure), for interfacing with an associated camera, optical window, lens, etc.

The faceplate may include a protective cover 1075 in accordance with the present disclosure. The protective cover 1075 may be oriented so as to protect at least a portion of the outer surface 1012 while provided in a first position (as shown). In the non-limiting example shown in FIG. 10*b*, the protective cover 1075 is attached to the mounting plate 1050 with a mechanism, (not explicitly shown) configured such that the protective cover 1075 may be reoriented between a covered position 1075 and a retracted position 178 during use (i.e. by following a predetermined trajectory 1077). The camera module and/or faceplate may include an actuation system (not explicitly shown) configured to actuate the protective cover 1075 so as to alter the orientation thereof during use (so as to selectively expose or cover at least a portion of the outer surface 1052 during use).

In aspects, the protective cover 1025, 1075 may be constructed from a lightweight material (i.e. to reduce the strength of the actuators necessary to reorient the protective cover 1025, 1075 during use), include a lubricious outer later (i.e. to reduce the amount of grime that may bond to the protective cover 1025, 1075 during use), be constructed with known optical properties (e.g. reflectivity, transmission, etc.), (i.e. to assess the state of cleanliness of the surroundings, to obtain an ambient temperature reading, etc.), and the like.

In aspects, the camera module may include an actuation system for adjusting the orientation of the protective cover during use. The actuation system may include or more actuators (e.g. electromechanical, electroactive material based actuators, pneumatic, hydraulic, etc.) and associated mechanisms (e.g. linkages, belts, gears, etc.) suitable for altering the orientation of the protective cover 1025, 1075 during use. The actuation system may optionally include one or more sensors suitable for assessing the orientation of the protective cover 1025, 1075 during use (i.e. so as to confirm operation of the protective cover 1025, 1075, to adjust the orientation of the protective cover 1025, 1075 between cleaning procedures, etc.). In one non-limiting example, the protective cover 1025, 1075 may be repositioned in combination with a cleaning procedure. Such a configuration may be advantageous for altering the flow pattern of the fluid across the outer surface 1012, 1052 during the procedure, thereby potentially increasing the efficiency of the cleaning operation, etc.

FIG. 10*c* shows a faceplate (i.e. equivalently the front of a camera, a portion of a camera housing, etc.) including one or more self-cleaning features in accordance with the present disclosure. The faceplate includes a mounting plate 1085, including a window pane 1087 (i.e. a lens, a window, a sheet, etc.), and a protective cover 1089. The protective cover includes one or more channels 1092, in fluid communication with one or more ports 1093*a-c* in accordance with the present disclosure. The channels 1092 may be configured so as to accept one or more fluids 1096 from associated fluid sources and/or fluid delivery lines 1095 in accordance with the present disclosure. The ports 1093*a-c* may be configured to direct flow of a fluid there through onto the window pane 1087, so as to provide a cleaning function during use.

In aspects, the protective cover 1089 may be oriented so as to protect at least a portion of the window pane 1087 while provided in a first position (as shown). In the non-limiting example shown in FIG. 10*c*, the protective cover 1025 is attached to the mounting plate 1085 at a hinge 1090 about which the protective cover 1089 may be pivoted 1091 during use. The camera module and/or faceplate may include an actuation system (not explicitly shown) configured to actuate the protective cover 1089 so as to alter the orientation thereof during use (so as to selectively expose or cover at least a portion of the window pane 1087 during use).

As shown in FIG. 10*c*, the protective cover 1089 may further be advantageous for directing the flow of one or more fluid jets from the ports 1093*a-c* along at least a portion of the window pane 1087 during a cleaning, or test cleaning procedure in accordance with the present disclosure. Such a configuration may be advantageous for cleaning the window pane 1087 while maintaining a protective cover thereof and thus reducing the amount of contamination that may collect on the window pane 1087 prior to subsequent use thereof.

In aspects, a protective cover in accordance with the present disclosure may include a manual cleaning element (e.g. a sponge, a cloth, etc.) and/or a compartment/holder configured to accept a manual cleaning element. Such a configuration may be advantageous for allowing a user to manually clean the lens/window/pane in cases of extreme grime, or as part of routine maintenance procedures.

Figure 11:
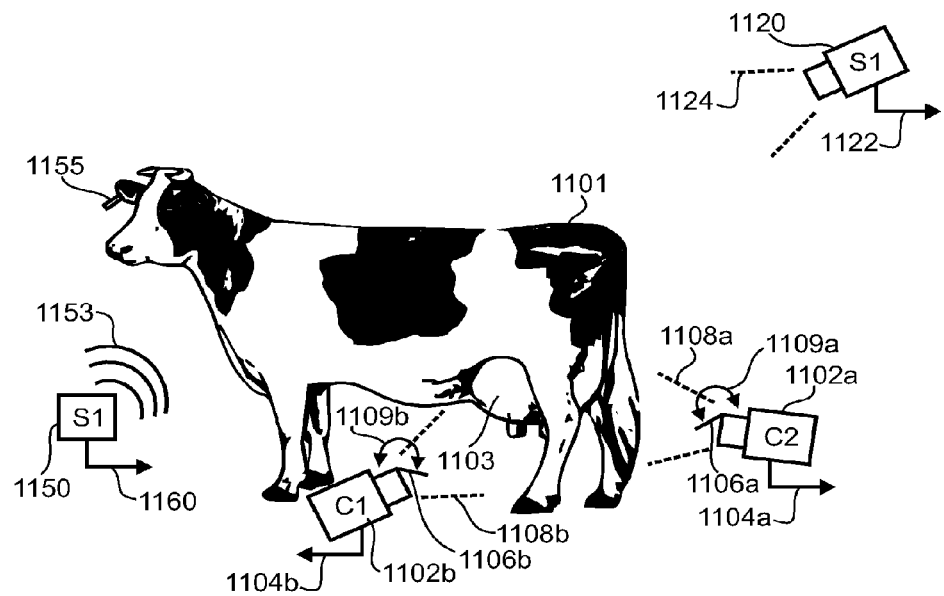
FIG. 11 shows aspects of a monitoring system in accordance with the present disclosure applied to a livestock monitoring application.

FIG. 11 shows aspects of a monitoring system in accordance with the present disclosure applied to a livestock monitoring application. The monitoring system may include one or more camera modules 1102*a-b*, each in accordance with the present disclosure. One or more of the camera modules 1102*a-b* may include a camera with a field of view 1108*a-b*, oriented so as to face a target 1101 (e.g. a scene, a work station, a vehicle, a living target, an animal, a cow, etc.). One or more of the camera modules 1102*a-b* may include a protective cover 1106*a-b*, each protective cover configured to move about a trajectory 1109*a-b* during use (i.e. so as to provide intermittent cover of one or more windows/lenses on the camera modules 1102*a-b* during use). The monitoring system may also include one or more sensing subsystem 1150 (e.g. an RFID locating system, a pyrometer, an ultrasonic sensor, a light curtain, etc.) and/or surveillance cameras 1120 configured so as to assess the target 1101 and/or an environment in the vicinity of the camera modules 1102*a-b* (i.e. a space encompassing at least a portion of the field of view 1108*a-b* of one or more of the camera modules 1102*a-b*) during use. The surveillance camera 1120 may include a field of view 1124 and a communication line 1122 to communicate an image and/or video feed of the target 1101 or an environment, in which the target 1101 resides, to one or more aspects of the monitoring system. In aspects, the target 1101 may include a tag 1155, the tag configured to store and/or collect identification information, physiological data, environmental data, kinematic data (i.e. movement, location tracking information, etc.) related to and/or from the target 1101. In aspects, one or more of the sensing subsystems 1150 may include a communication line 1160 to communicate one or more obtained signals to one or more aspects of the monitoring system.

One or more of the camera modules 1102a-b may include a communication line 1104a-b to communication an image and/or video feed, a status update, etc. to one or more aspects of the monitoring system.

In aspects, one or more of the sensing subsystems 1150 may include an RFID reader. The RFID reader may be configured to locate and/or identify one or more tags 1155 placed on the target 1101 or in the vicinity thereof. The RFID reader may be configured to periodically broadcast an RF signal 1153 to communicate with a local ID tag 1155 perhaps placed onto the target 1101. The sensing subsystem 1150 may be configured to communicate a target acquired signal 1160, to one or more aspects of the monitoring system (e.g. perhaps to one or more of the camera modules 1102a-b). In one non-limiting example, the target 1101 may be an animal (e.g. a cow, a sheep, a lamb, a pig, etc.) equipped with an RFID tag 1155. A RFID tag reader 1150 may be positioned near to one or more camera modules 1102a-b such that as the target 1101 moves within range of the reader 1150 (determined via broadcast and receipt of an RF signal 1153 between the reader 1150 and the tag 1155), the reader is configured to communicate the control signal 1160 to one or more entities in the monitoring system. Upon receipt of the control signal 1160, one or more of the camera modules 1102a-b may be configured to awaken and continue with operations (i.e. opening a protective cover 1005a-b, assessing cleanliness, obtaining one or more reading, capture a video, etc.).

In aspects, a sensing subsystem 1150 and/or tag 1155 may be configured to communicate one or more of identification data, physiological data, environmental data (e.g. temperature, humidity, light level, etc.) to one or more aspects of the monitoring system.

Figure 12:
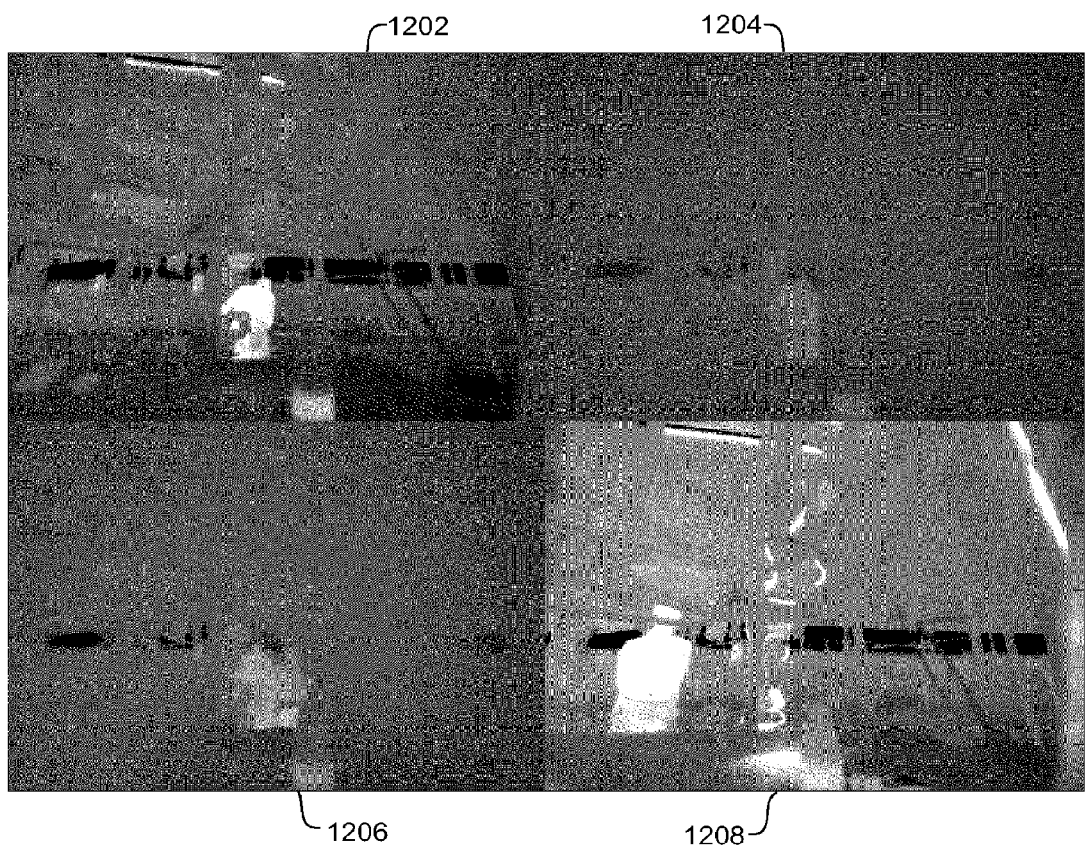
FIG. 12 shows images taken with a camera module in accordance with the present disclosure in various states of use.

FIG. 12 shows images taken with a camera module in accordance with the present disclosure in various states of use: a clean image 1202, a wet grimy image 1204, a dry grimy image 1206, a cleaned image 1208. The clean image 1202 is taken while the lens/window/pane of the camera module is very clean. Such a clean image 1202 may be used as a reference image in a cleaning algorithm in accordance with the present disclosure, etc. The wet grimy image 1204 was taken just after an equipment wash-down procedure splashed a combination of wet and muddy grime over the lens (i.e. a combination of feces, mud, water, fibrous matter, etc.). As can be seen, the quality of the thermal image obtained in such a state is significantly reduced versus the clean image 1202. The grime is allowed to dry and a subsequent image is shown (the dry grimy image 1206). The quality of the thermal image obtained under such conditions is significantly reduced versus the clean image 1202. A cleaning process in accordance with the present disclosure is performed and a subsequent image is taken (the cleaned image 1208). As can be seen, the cleaned image 1208 has restored the quality of the thermal image that can be obtained with the camera module in this grimy environment. In this particular non-limiting example, the cleaning procedure included a step of applying a stream of purified water (i.e. purified with a limestone filter) over the surface of the lens/window/pane from 6 ports placed around the perimeter of the lens/window/pane and a step of applying a jet of dry air (i.e. provided by a pressurized air source) to remove residual purified water from the water cleaning step.

The monitoring system may include an array of camera modules each in accordance with the present disclosure. One or more camera modules may be operated synchronously by the monitoring system.

In an application relating to industrial monitoring, one or more camera modules may be positioned high above the assembly line, conveyor systems, etc. Such a camera module may be configured so as to observe one or more macro sized regions of the manufacturing space.

In aspects, a camera module and/or faceplate in accordance with the present disclosure may include and/or interface with a fluid recovery system. The fluid recovery system may include a fluid catch, arranged in the vicinity of the lens/window so as to retrieve fluid from the lens/window after an associated cleaning process. The fluid recovery system may include a fluid retrieval line connecting the fluid catch to the fluid control system and the fluid control system may include a pump, a filter system, etc. configured to recover the excess fluid from a previous cleaning cycle and recycle it for use in another cleaning cycle.

A camera module and/or monitoring system in accordance with the present disclosure may include one or more cleanliness assessment algorithms. The cleanliness assessment algorithm may be configured to assess the cleanliness of one or more lenses in accordance with the present disclosure and to manage and/or schedule cleaning of the lenses during use. The cleanliness assessment system may compare one or more aspects of two or more images (e.g. successive images, a current image with a reference image, etc.) to determine the state of cleanliness thereof.

In aspects, the cleanliness assessment system may include a scheduling algorithm for configuring when to clean one or more camera modules within a monitoring system. The cleanliness assessment system may include an adaptive algorithm, the adaptive algorithm configured to track cleaning and performance aspects of one or more camera modules over time and to adjust the cleaning schedule in accordance with the historical performance variation associated there with.

In aspects, a fluid control system in accordance with the present disclosure may be configured to perform a pre-cleaning procedure on the lens/window, coordinating a multistage cleaning process, coordinating protective cleaning processes, etc.

In aspects, a camera module, faceplate, and/or lens may include a combined cleaning and/or heating/cooling element, configured to provide additional temperature control features for the camera module.

In aspects, a camera module in accordance with the present disclosure may include one or more defrosting devices (e.g. heaters, heater bands, Peltier devices, etc.). The defrosting device may be embedded and/or attached to a faceplate, a camera housing, a lens, etc. in accordance with the present disclosure. The defrosting device may be configured so as to maintain an adequate temperature so as to prevent the formation of dew and/or frost on the lens during operation.

In aspects, a camera module in accordance with the present disclosure may include one or more air drying devices. The air drying device may be configured within the fluid control system, or situated along a fluid delivery line. The drying device may include one or more heating bands. Each band may be configured to warm the gas as it passes near to the heater band.

In aspects, a reservoir in accordance with the present disclosure may include on or more hygroscopic structures (e.g. desiccants, silica particles, etc.) arranged within the reservoir to draw out moisture from gaseous species contained therein. Such a configuration may be advantageous for drying a gaseous specie (e.g. air) for use in a cleaning process. Some non-limiting examples of suitable hygroscopic substances include cellulose fibers, sugars, honey, glycerol, ethanol, methanol, diesel fuel, sulfuric acid, methamphetamine, fertilizers, salts, zinc chloride, calcium chloride, potassium hydroxide, sodium hydroxide, combinations thereof, and the like.

In aspects, the camera module may be configured for gas analysis. In such applications, the chemical makeup of one or more constituents of the cleaning solution may be chosen so as to minimize cross over with an associated gas specie under study (e.g. methane). The evaluation of the quantity of gas may be performed by a plurality of differential infra-red imaging process (e.g. spatial, spectral, and temporal field analyses).

In particular, spatial differentiation enables the luminescence of the gas cloud to be eliminated and to only take its transmission into account. This characteristic may enable the system to detect the gas even when it is at an ambient temperature.

In aspects, spectral differentiation may be used to elucidate the spectral nature of the gas, which may be isolated through the successive utilization of several filters. Comparison of filter readings (i.e. comparison of readings from differently filtered spectra) may enable formulation of a value corresponding to the gas cloud concentration integrated along the line of sight within the field of view of the camera.

Such a system may be advantageous for providing another layer of safety to the detection of combustible and toxic gases in petrochemical production, refining, storage, and distribution operations. Such systems may also allow processing plants to operate at higher levels of safety, efficiency, and economy due to the enhanced ability to supervise large areas, identify the gas species when leaks occur, and observe gas movement in the atmosphere in real time.

In aspects, the camera module may be configured to conform to one or more health and safety standards. The global standard IEC 60529 or the European equivalent EN 60529 were formulated to specific criteria to protect the electronic devices in environments where the enclosure is subjected to external mechanical action required sustainable encapsulation of the components to minimize the risk of damage thereto. This protection is measured according to an NS-scale and is defined according to International Standard IEC 62262:2002 or the European counterpart, EN62262.

In aspects, one or more camera modules in accordance with the present disclosure may be included in a monitoring system. The monitoring system may include a computer system, a cloud based processing system, etc. including one or more camera management algorithms, configured to analyze data from one or more camera modules and control one or more aspects of the camera module (e.g. power settings, cleaning operations, optical controls, shutter controls, servomotion controls, etc.). The computer system may be configured to operate one or more cleaning modules sequentially, in parallel, in real-time, etc. The camera management algorithm may be configured to detect when a lens on a camera module is dirty via a method in accordance with the present disclosure. The system may also analyze the images received from the cameras to determine if a cleaning operation should be suspended until a more appropriate time. Such cleaning aspects may be suspended when system detects a suitable target (e.g. a crime scene, a crowd of people, an animal, a gas leak, an active manufacturing line, etc.) in the field of view of one or more of the camera module. Such suspension of cleaning may be performed until adequate analysis of the target can be completed and the associated camera module is free from more pressing matters.

In aspects, the camera module may be included as part of a livestock management system (e.g. managing a milking process, reproductive scheduling, herd health monitoring, etc.). In such systems, the management of cow movement is generally focused around feeding and milking processes as well as monitoring of livestock during the mating season. Often, the cows can go in to a milking robot to be milked and how often they have access to concentrates. The movement of animals within the farmyard may be broken down into aspects of free cow traffic and controlled cow traffic. The farms that make use of free cow traffic are generally configured without gates and the cows may decide how they want to move throughout the given space. In farms with controlled cow traffic, the cows remain in control of how they want to move, but their path may be restricted by means of gate systems and assets. In many systems with guided cow traffic, the cows often feed first before milking. Under this system, cows are milked after having had access to food.

Such path planning may be considered when positioning a camera module in accordance with the present disclosure within the monitoring environment. In some livestock monitoring applications, such freedom of movement may necessitate attachment of the camera module in close proximity to the feeding station, milking station, and/or gates leading there to or there from. Thus the environment surrounding the camera module may be particularly prone to contamination.

It will be appreciated that additional advantages and modifications will readily occur to those skilled in the art. Therefore, the disclosures presented herein and broader aspects thereof are not limited to the specific details and representative embodiments shown and described herein. Accordingly, many modifications, equivalents, and improvements may be included without departing from the spirit or scope of the general inventive concept as defined by the appended claims and their equivalents.

The invention claimed is:

1. A self-cleaning window kit for installation along an optical path of a camera, the self-cleaning window kit comprising:
   a housing configured to be attached to a lens of a camera such that the housing provides an aperture along an optical path of the camera;
   at least one port coupled to the housing configured to deliver a cleaning fluid;
   an optically transparent window pane coupled to the housing substantially coextensive with the aperture;
   one or more valves in fluid communication with the at least one port, the one or more valves being configured to control a flow of the cleaning fluid to the at least one port; and
   a controller configured to control the at least one port to deliver the cleaning fluid toward the optically transparent window pane to remove impurity on the optically transparent window pane.

2. The self-cleaning window kit in accordance with claim 1, wherein the optically transparent window pane is substantially transparent to infrared radiation and the camera is an infrared camera.

3. The self-cleaning window kit in accordance with claim 2, wherein the optically transparent window pane comprises a material selected from the group consisting of germanium, calcium fluoride, sapphire, lithium fluoride, zinc selenide, barium fluoride, IR transmitting polymers, and combinations thereof.

4. The self-cleaning window kit in accordance with claim 1, wherein the at least one port comprises a nozzle configured to form a fluid jet of a substantially controlled shape upon exiting the nozzle.

5. The self-cleaning window kit in accordance with claim 4, wherein the controlled shape is selected from the group consisting of a line, an ellipse, a crescent, a hemisphere, a fan, and combinations thereof.

6. The self-cleaning window kit in accordance with claim 1, wherein the at least one port is configured to accept a gas or a liquid based cleaning fluid.

7. The self-cleaning window kit in accordance with claim 1, wherein the at least one port includes a first port configured to accept a gas based cleaning fluid and a second port configured to accept a liquid based cleaning fluid.

8. The self-cleaning window kit in accordance with claim 1, further comprising a fluid reservoir in fluid communication with the at least one port, the fluid reservoir configured to hold at least a portion of the cleaning fluid.

9. The self-cleaning window kit in accordance with claim 1, further comprising a protective cover adapted to cover the optically transparent pane when the camera is not in use.

10. The self-cleaning window kit in accordance with claim 9, wherein the protective cover is adapted to be actuated between a first and a second position, the first position substantially covering the optically transparent window pane and the second position substantially exposing the optically transparent window pane.

11. A self-cleaning window kit for installation along an optical path of a camera, the self-cleaning window kit comprising:
    a housing configured to be attached to a lens of a camera such that the housing provides an aperture along an optical path of the camera;
    at least one port coupled to the housing configured to deliver a cleaning fluid;
    an optically transparent window pane coupled to the housing substantially coextensive with the aperture;
    a mixer in fluid communication with the at least one port, the mixer configured to mix a first fluid with a second fluid to form the cleaning fluid; and
    a controller configured to control the at least one port to deliver the cleaning fluid toward the optically transparent window pane to remove impurity on the optically transparent window pane.

12. The self-cleaning window kit in accordance with claim 11, wherein the first fluid is substantially water and the second fluid comprises one or more of a surfactant, a detergent, an acid, or combinations thereof.

13. The self-cleaning window kit in accordance with claim 1, wherein the cleaning fluid consists of food safe constituents.

14. The self-cleaning window kit in accordance with claim 1, further comprising a canister in fluid communication with the at least one port, the canister configured to house a quantity of gas.

15. The self-cleaning window kit in accordance with claim 1, wherein the housing comprises one or more channels in fluid communication with the at least one port.

16. The self-cleaning window kit in accordance with claim 15, wherein the channels are formed from a process selected from the group consisting of trench machining, milling, drilling, routing, etching processes, injection molding, EDM, microfluidic processes, micro-molding processes, screen printing, and combinations thereof.

* * * * *